US012599537B1

(12) United States Patent
Su et al.

(10) Patent No.: US 12,599,537 B1
(45) Date of Patent: Apr. 14, 2026

(54) MASSAGE STRUCTURE WITH VARIABLE INNER DIAMETER

(71) Applicant: DONGGUAN YANSHI ELECTRONIC TECHNOLOGY CO., LTD., Dongguan (CN)

(72) Inventors: Yanyan Su, Hefei (CN); Wenqiang Wu, Jingzhou (CN)

(73) Assignee: Dongguan Yanshi Electronic Technology Co., Ltd., Dongguan (CN)

(*) Notice: Subject to any disclaimer, the term of this patent is extended or adjusted under 35 U.S.C. 154(b) by 0 days.

(21) Appl. No.: 19/404,094

(22) Filed: Dec. 1, 2025

(30) Foreign Application Priority Data

Oct. 27, 2025 (CN) ........................ 202511549064.1

(51) Int. Cl.
*A61H 39/04* (2006.01)

(52) U.S. Cl.
CPC ....... *A61H 39/04* (2013.01); *A61H 2201/149* (2013.01)

(58) Field of Classification Search
CPC ........ A61H 19/32; A61H 19/00; A61H 19/30; A61H 19/50; A61H 2201/149; A61H 39/04; A61H 7/00–008; A61H 7/003–005; A61H 2007/009; A61H 2205/06; A61H 2205/065; A61H 2205/10125; A61H 2205/087; A61H 23/0254; A61H 2011/005; A61H 1/006; A61H 2205/067; A61H 2205/10–125; A61H 11/00;
(Continued)

(56) References Cited

U.S. PATENT DOCUMENTS

| | | | | |
|---|---|---|---|---|
| 12,396,918 B1 * | 8/2025 | Huang | A61H 19/44 | |
| 2015/0196454 A1 * | 7/2015 | Levy | A61H 19/32 | 600/38 |

(Continued)

FOREIGN PATENT DOCUMENTS

| | | | |
|---|---|---|---|
| CN | 104736123 A | 6/2015 | |
| ES | 2680069 A1 * | 9/2018 | A61H 7/003 |

OTHER PUBLICATIONS

ES2680069A1 Specification Machine Translation (Year: 2026).*

*Primary Examiner* — Bradley H Philips
*Assistant Examiner* — Abigayle Dale
(74) *Attorney, Agent, or Firm* — Ming Jiang; OPENPTO US LLC

(57) ABSTRACT

A massage structure with a variable inner diameter includes a deformation assembly and a rotating sleeve, where the deformation assembly is sleeved outside a first massage area; the deformation assembly includes a deformation portion, a constraint portion, and a first engaging portion, where the constraint portion and the first engaging portion are respectively disposed at both ends of the deformation portion along a central axis L1 of the deformation assembly, and the constraint portion is configured to limit the movement of the deformation portion; the rotating sleeve is provided with a second engaging portion; the first engaging portion and the second engaging portion are linked in a coupled manner, and the first engaging portion moves closer to or away from the constraint portion along the axis L1, which drives at least a portion of the deformation portion to deform toward or away from the first massage area.

20 Claims, 21 Drawing Sheets

(58) Field of Classification Search
CPC .... A61H 2201/0192; A61H 2201/0196; A61H 9/0057; A61H 2009/0064
See application file for complete search history.

(56) References Cited

U.S. PATENT DOCUMENTS

| | | | | |
|---|---|---|---|---|
| 2016/0279020 | A1* | 9/2016 | Timmermans ......... | A61H 19/00 |
| 2017/0231801 | A1* | 8/2017 | Matsuura ............... | A61H 19/00<br>600/38 |

* cited by examiner

MASSAGE STRUCTURE WITH VARIABLE INNER DIAMETER

CROSS-REFERENCE OF RELATED APPLICATION

The present application claims priority to Chinese Patent Application No. 202511549064.1 filed on Oct. 27, 2025, which is incorporated herein by reference in its entirety.

TECHNICAL FIELD

The present disclosure relates to the technical field of massage equipment, and in particular to a massage structure with a variable inner diameter.

BACKGROUND

With social development and improvement of living standards, people's demand for health care and physical relaxation is increasingly growing. As convenient and effective physiotherapy tools, massage devices have been widely used in homes and professional places. Massagers used to massage body parts of users usually employ annular or cylindrical structures, and press muscles by applying external pressure or inflating internally to achieve the effects of relieving fatigue and promoting blood circulation.

Encircling-type massage structures in the prior art mainly have the following deficiencies: many massage devices have a fixed encircling inner diameter, which cannot adapt to varying circumferences of different users or different body parts of the same user, resulting in uneven distribution of massage pressure and affecting the use comfort and massage effect; some massage structures with adjustment functions usually employ means of airbag inflation/deflation or simple mechanical clamping, and airbag adjustment has the deficiencies of imprecise pressure control, slow response and noise, while mechanical detent adjustment is usually stepwise, such that stepless adjustment cannot be achieved, an adjustment process is not smooth, and user experience is poor; and in order to achieve inner diameter changes, some massage structures employ elastic sleeves or flexible support members, but lack effective and reliable support and guidance during the deformation process, which may cause irregular deformation of massage sleeves, fail to accurately apply pressure to target muscle groups, and even affect the service life due to structural distortion.

Therefore, there is an urgent need in the art for a massage structure with a variable inner diameter that achieves smooth and precise stepless adjustment and provides stable and reliable support during the inner diameter change.

SUMMARY

In view of the above problems, an objective of the present disclosure is to provide a massage structure with a variable inner diameter that enables smooth and stable inner diameter adjustment, so as to solve the above problems.

The present disclosure is achieved by means of the following technical solution:

The present disclosure provides a massage structure with a variable inner diameter, and the massage structure with a variable inner diameter includes a deformation assembly and a rotating sleeve, where the deformation assembly is sleeved outside a first massage area; the deformation assembly includes a deformation portion, a constraint portion, and a first engaging portion, where the constraint portion and the first engaging portion are respectively disposed at both ends of the deformation portion along a central axis L1 of the deformation assembly, and the constraint portion is configured to limit the movement of the deformation portion; the rotating sleeve is provided with a second engaging portion; the first engaging portion and the second engaging portion are linked in a coupled manner, such that a rotational motion of the rotating sleeve around the axis L1 is converted into a linear reciprocating motion of the first engaging portion along the axis L1; and the first engaging portion moves closer to or away from the constraint portion along the axis L1, which drives at least a portion of the deformation portion to deform toward or away from the first massage area, thereby causing an inner diameter of the deformation assembly to shrink or expand.

According to the technical solutions in the embodiments of the present disclosure, the present disclosure achieves stepless adjustment of the inner diameter through continuous rotation of the rotating sleeve, and the user may choose a most appropriate pressure for comfortable and effective massage by finely tuning according to his/her own feeling, which brings better massage experience than the traditional stepped adjustment, and meets the personalized needs of the user for massage pressure. The presence of the deformation assembly ensures that the massage sleeve is not twisted or partially wrinkled during a deformation process, but achieves uniform radial contraction and expansion, such that a massage force is uniformly distributed, a massage effect and comfort are enhanced, and a structure of the massage sleeve is protected, thereby prolonging the service life thereof.

In some embodiments, the first engaging portion and the second engaging portion have threaded structures engaged with each other; and during coupling linkage, the rotating sleeve rotates, and drives the first engaging portion to perform a linear reciprocating motion along the axis L1 through threaded transmission.

According to the technical solutions in the embodiments of the present disclosure, the threaded transmission enables an extremely high control precision, and allows the user to perform delicate and stepless pressure fine-tuning, thereby facilitating adjustment to a most appropriate massage intensity. The screw thread pair has a self-locking characteristic. Once adjusted in place, the first engaging portion is inherently prevented from accidental movement due to threaded engagement without an external torsional force, thereby ensuring absolute stability of pressure during the massage process, and preventing loosening due to slight movement of the user's body. The present disclosure integrates a motion conversion mechanism on a mating surface between the rotating sleeve and the first engaging portion, without the need for additional complex parts, such that an overall structure thereof is very compact, sturdy and durable, with high transmission efficiency and long service life.

In some embodiments, the first engaging portion is a cylindrical body; the second engaging portion is a waist-shaped groove; the cylindrical body is movably disposed in the waist-shaped groove, and an outer peripheral surface thereof is fitted with an inner wall of the waist-shaped groove; an included angle a is formed between a length direction of the waist-shaped groove and the axis L1, where 90°>a>0; and during coupling linkage, the rotating sleeve rotates, squeezes the cylindrical body through the inner wall of the waist-shaped groove, drives the cylindrical body to move in the length direction of the waist-shaped groove, and then drives the first engaging portion to perform a linear reciprocating motion along the axis L1.

According to the technical solutions in the embodiments of the present disclosure, surface contact of cooperation between the cylindrical body and the waist-shaped groove ensures stable transmission, and enables to withstand a certain impact and vibration, thereby achieving high operation reliability. The included angle a and the smoothness of a contact surface achieve a very smooth adjustment experience with a comfortable damping effect and enhance tactile quality of the massage structure.

In some embodiments, a guide rail is further included, the guide rail is disposed along the axis L1; the first engaging portion is provided with a first guide groove that cooperates with the guide rail; and the cooperation between the guide rail and the first guide groove constrains a movement direction of the first engaging portion.

According to the technical solutions in the embodiments of the present disclosure, the cooperation between the guide rail and the first guide groove ensures that the first engaging portion moves strictly along the axis L1, which prevents mechanism jamming, wear or unsmooth adjustment caused by a motion trajectory deviation, and the inner diameter adjustment is smooth and accurate. The guide rail structurally enhances the rigidity of the first engaging portion when bearing a reaction force from the deformation of the deformation portion, prevents the first engaging portion from shaking, and enhances the stability and reliability of the entire deformation assembly under load.

In some embodiments, the rotating sleeve is further provided with a first limiting portion; the first guide groove is provided with a second limiting portion at an end away from the constraint portion along the axis L1; the first engaging portion has two limit positions when performing a linear reciprocating motion along the axis L1; at one of the limit positions, the first engaging portion is blocked by the first limiting portion; and at the other limit position, the second limiting portion is blocked by the guide rail.

According to the technical solutions in the embodiments of the present disclosure, a limiting mechanism prevents structural damage such as excessive deformation and component fracturing of the deformation portion caused by excessive rotation by the user, enhances the durability and reliability of the massage structure, ensures that the inner diameter of the massage sleeve always changes within a preset safe and effective range, and prevents the failure of massage pressure or damage to a body of the massage sleeve caused by range exceeding.

In some embodiments, an elastic massage sleeve configured to envelop the first massage area is further included; and both the deformation assembly and the rotating sleeve are sleeved outside the massage sleeve, and the deformation assembly is configured to provide support for the massage sleeve such that an inner diameter of the massage sleeve reaches a set size.

In some embodiments, the deformation portion has a strip-shaped structure; and a plurality of the deformation portions are arranged, and all the deformation portions are disposed circumferentially around the massage sleeve.

According to the technical solutions in the embodiments of the present disclosure, the circumferential arrangement of the plurality of the deformation portions ensures that the massage sleeve shrinks uniformly during adjustment and pressure is applied to a wrapped body part in an encircling-type and uniformly distributed manner, which prevents discomfort caused by single-point pressure concentration, and enhances the comfort and effect of massage. The plurality of the strip-shaped deformation portions collectively form a stable frame structure, which significantly enhances the rigidity of the entire deformation assembly, and ensures that the deformation assembly is less prone to instability or distortion when bearing a reaction force from the internal massage sleeve, thereby ensuring the reliability of long-term use.

In some embodiments, the deformation portion includes a deformation segment; and when the deformation portion deforms toward the massage sleeve to shrink the inner diameter of the massage sleeve, the deformation segment constitutes a main deformation occurrence area.

According to the technical solutions in the embodiments of the present disclosure, by presetting a position of the deformation segment, the present disclosure accurately controls a main action point where pressure is applied to the massage sleeve. This design enables a massage force to act more accurately on specific muscle groups or acupoints of a body part, thereby enhancing the massage effect. Concentrating the deformation on the designed deformation segment prevents unpredictable stress concentration and fatigue damage in other areas of the deformation portion. Equivalently, a safe bending zone is set for the deformation portion, which not only ensures functional realization but also greatly enhances the durability and reliability of the entire deformation assembly.

In some embodiments, material hardness of the deformation segment is less than material hardness of any other portion of the deformation portion.

According to the technical solutions in the embodiments of the present disclosure, the present disclosure controls a deformation position by utilizing mechanical properties of material, and ensures that deformation of each massage structure occurs accurately in a predetermined area every time when used, thereby ensuring the consistency of massage structure performance. The soft deformation segment better absorbs and disperses the stress generated during a deformation process, and prevents occurrence of a stress peak at a junction between a rigid portion and the deformation segment, thereby improving the fatigue resistance of the deformation portion and prolonging the service life thereof.

In some embodiments, in a direction perpendicular to the axis L1, a cross-sectional dimension of the deformation segment is smaller than a cross-sectional dimension of any other portion of the deformation portion.

According to the technical solutions in the embodiments of the present disclosure, the present disclosure controls a deformation position of the deformation portion through geometric dimension control, which is reliable and has good repeatability, thereby ensuring the consistency and predictability of massage structure performance.

In some embodiments, an auxiliary member is further included, the auxiliary member is sleeved outside all the deformation portions and configured to push the corresponding deformation portion to protrude toward the massage sleeve; and the deformation segment is a portion of the deformation portion corresponding to the auxiliary member.

In some embodiments, the auxiliary member is provided with a second guide groove adapted to the guide rail; and the auxiliary member is configured to move along the axis L1 to adjust an acting position on the deformation segment of the deformation portion.

According to the technical solutions in the embodiments of the present disclosure, a guide structure of the guide rail ensures the accuracy of linear movement of the auxiliary member, such that the user accurately positions a protruding effect of the deformation segment to a specific position of a body part, thereby achieving precise control of a massage height. The guide structure prevents the auxiliary member from shaking or rotating during the movement process, ensures the stability and tactile smoothness of adjustment, and enhances the tactile quality and user experience of the massage structure.

In some embodiments, the deformation portion is composed of a plurality of support segments hingedly connected end to end.

According to the technical solutions in the embodiments of the present disclosure, each of the support segments hinged to each other independently generates a separate protrusion under the action of the auxiliary member, such that the massage sleeve forms very localized pressure points to accurately stimulate acupoints or muscle pain points, thereby achieving a good massage effect; and a chain structure is more flexible than an integral strip-shaped structure, which better adapts to the muscle peristalsis and slight shape changes of a body part during massage, achieves dynamic fitting, and prevents discomfort caused by excessive compression.

In some embodiments, an end of each of the support segments is further provided with a third limiting portion; the third limiting portion is disposed on a side of the support segment close to the massage sleeve; and when the support segment rotates around a point of hinge with the adjacent support segment to a limit position away from the massage sleeve, the third limiting portion is configured to block further rotation.

According to the technical solutions in the embodiments of the present disclosure, the third limiting portion provides a unified physical reference position for all the support segments in a relaxed state. This ensures that after massage each time, the massage sleeve quickly returns to a preset maximum inner diameter state, which prevents incomplete resetting or jamming caused by scattered rebound positions of the support segments, thereby enhancing the reliability and consistency of actions of the massage structure. The third limiting portion prevents excessive reverse rotation of the support segment, and even counter-articular excessive eversion, thereby protecting the hinge joints from damage, maintaining the integrity and stability of the entire chain-shaped deformation portion, and prolonging the service life thereof.

In some embodiments, the deformation portion includes a reset rope and a plurality of support segments; a surface of the support segment away from the constraint portion along the axis L1 is a guide surface, and the guide surface is configured to come into contact with the adjacent support segment; a distance between the guide surface and the constraint portion progressively decreases from a side of the guide surface away from the massage sleeve to a side of the guide surface close to the massage sleeve; the side of the support segment away from the massage sleeve is further provided with a third engaging portion configured to perform snap-fitted engagement with an end of the adjacent support segment away from the constraint portion; the reset rope is connected between the first engaging portion and the constraint portion, and passes through the third engaging portions of all the support segments; the third engaging portion is fixedly connected to the reset rope; and the first engaging portion performs a linear reciprocating motion along the axis L1 to tension or relax the reset rope.

According to the technical solutions in the embodiments of the present disclosure, the present disclosure achieves the controllability and repeatability of radial motion of the support segments through the relaxation overlapping and tension resetting of the reset rope and the plurality of the support segments, in combination with the precise guidance by the inclined guide surface, thereby ensuring the uniformity and stability of changes in the inner diameter of the massage sleeve.

In some embodiments, the support segment is configured as follows: when moving toward the constraint portion, the first engaging portion is pushed by the first engaging portion to abut against the guide surface of the adjacent support segment, and moves along the guide surface until the third engaging portion is snap-fitted with the adjacent support segment and overlaps with the adjacent support segment in a radial direction of the massage sleeve; when moving away from the constraint portion, the first engaging portion is pulled by the reset rope to reset to a state where a surface thereof perpendicular to the radial direction of the massage sleeve is flush with the adjacent support segment; and the plurality of the support segments overlap in the radial direction of the massage sleeve to push the massage sleeve to deform.

According to the technical solutions in the embodiments of the present disclosure, the motion of the support segment is precisely guided, which is a definite process of pushing, abutting, inclined surface sliding, snap-fit overlapping, which ensures the synchronization and consistency of contraction of all the support segments, and prevents the risk of jamming or asynchrony during the motion process.

In some embodiments, a side of the first engaging portion close to the deformation portion is further provided with a convex block; and in a direction away from the first engaging portion along the axis L1, the first support segment is provided with a third guide groove adapted to the convex block, and the third guide groove cooperates with the convex block to limit the first support segment to only have the freedom of movement in the radial direction of the massage sleeve.

According to the technical solutions in the embodiments of the present disclosure, the motion of the first support segment is defined as radial movement, which ensures that the contraction process starts with precise radial extrusion, rather than a complex motion potentially containing axial components, thereby ensuring the purity, synchronization, and predictability of contraction action of the entire deformation assembly. The massage structure provided by the present disclosure prevents energy loss and action delay caused by possible axial endplay or minor rotation of the first support segment, such that every tiny displacement of the first engaging portion may be efficiently and instantly converted into effective radial adjustment, thereby enhancing control precision and response speed of the massage structure.

In some embodiments, the third guide groove is a T-shaped groove; and a shape of the convex block matches a shape of the third guide groove.

The present disclosure provides a massage structure with a variable inner diameter, and the massage structure with a variable inner diameter includes a deformation assembly, a rotating sleeve, and a cup body, where both the deformation assembly and the rotating sleeve are sleeved outside a first massage area; the cup body is provided with a rotatable adjustment ring, where the adjustment ring is snap-fitted with the rotating sleeve and rotates synchronously with the rotating sleeve; and the adjustment ring is configured to drive the rotating sleeve to rotate, so as to push a middle portion of the deformation assembly to deform toward or away from the first massage area, thereby causing an inner diameter of the deformation assembly to shrink or expand.

In some embodiments, an auxiliary member is further included, the auxiliary member is sleeved outside the deformation assembly and configured to push a corresponding portion of the deformation assembly to protrude toward the massage sleeve, where this portion deforms prior to other portions; a surface of the cup body is provided with an adjustable opening that extends along the axis L1; an outer peripheral surface of the auxiliary member is provided with an adjustment button, and the adjustment button extends through the adjustable opening to protrude from the cup body; and an elastic sheet is disposed on the adjustment button, and the elastic sheet tightly abuts against the outer peripheral surface of the cup body to position the auxiliary member.

Additional aspects and advantages of the present disclosure will be set forth partially in the following description, which will become obvious in the following description, or may be learned by practice of the present disclosure.

BRIEF DESCRIPTION OF THE DRAWINGS

To describe the technical solution in the embodiments of the present disclosure more clearly, the accompanying drawings required for describing the embodiments are briefly described below. It is to be understood that the following accompanying drawings show merely some embodiments of the present disclosure, and therefore it is not to be construed as a limitation to the scope. Those of ordinary skill in the art can also derive other accompanying drawings from these accompanying drawings without making inventive efforts.

Figure 1:
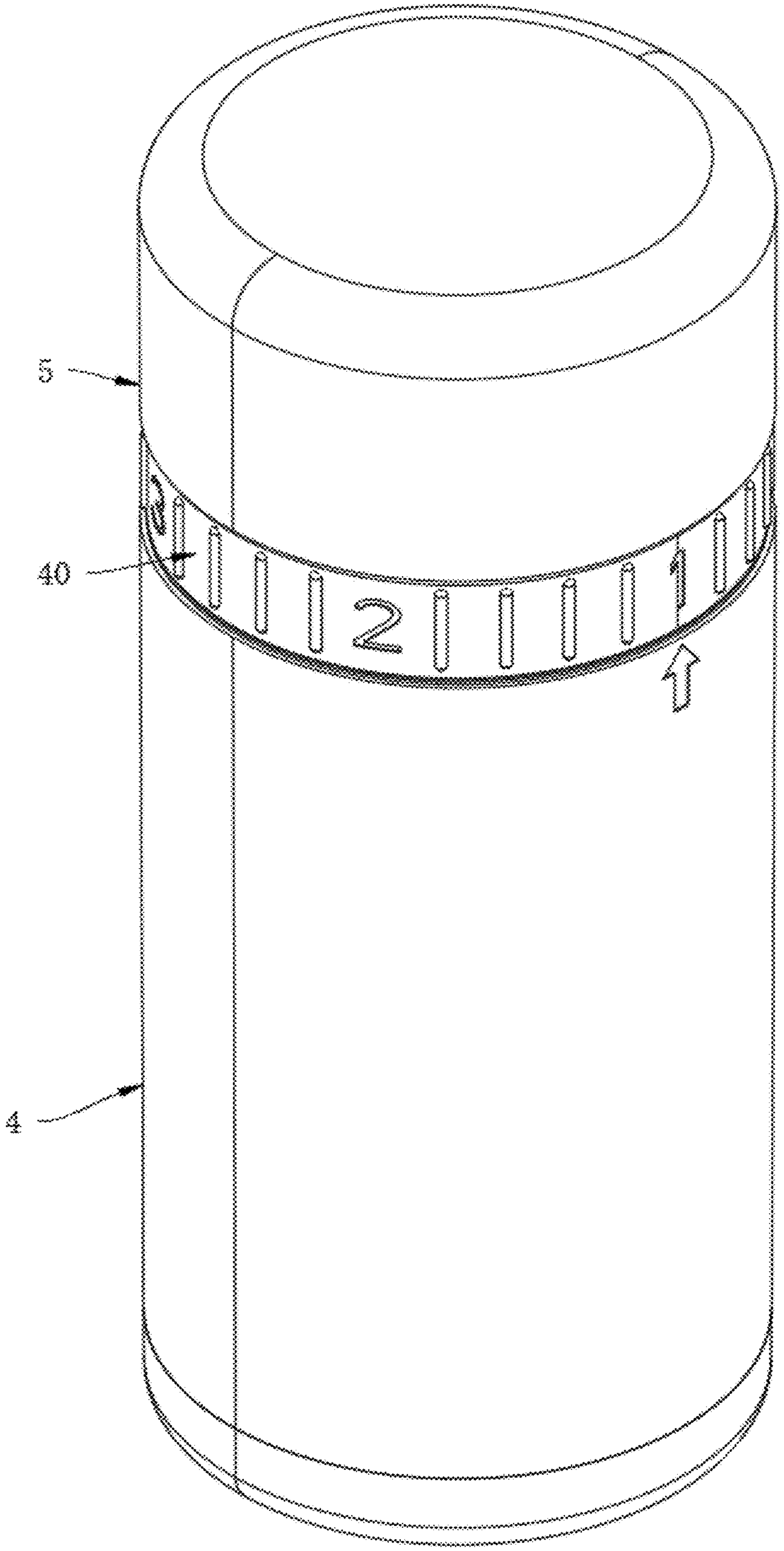
FIG. 1 is a schematic diagram of an external structure of a massage structure with a variable inner diameter provided in some embodiments of the present disclosure.
Figure 2:
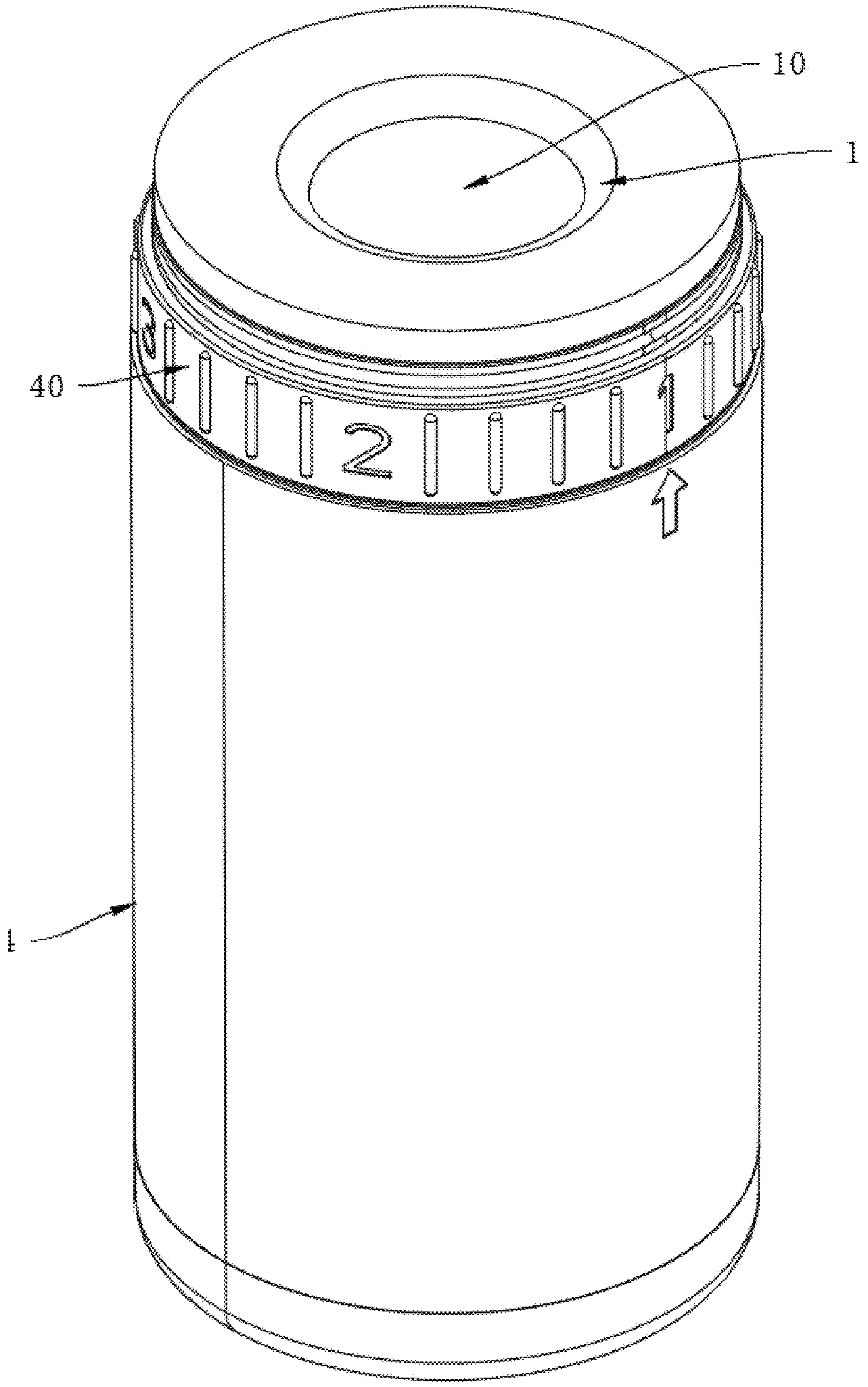
FIG. 2 is a schematic structural diagram of a housing provided in some embodiments of the present disclosure.
Figure 3:
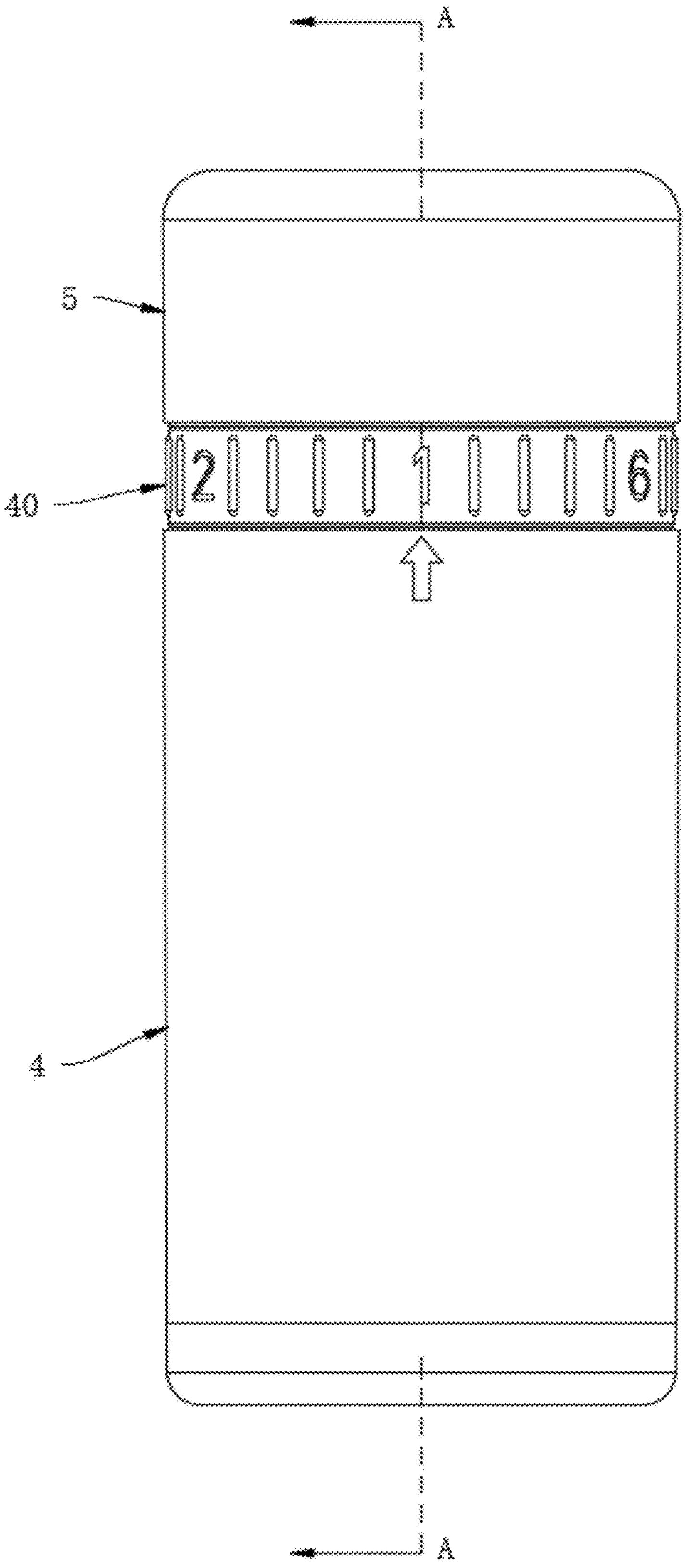
FIG. 3 is a side view of a massage structure with a variable inner diameter provided in some embodiments of the present disclosure.
Figure 4:
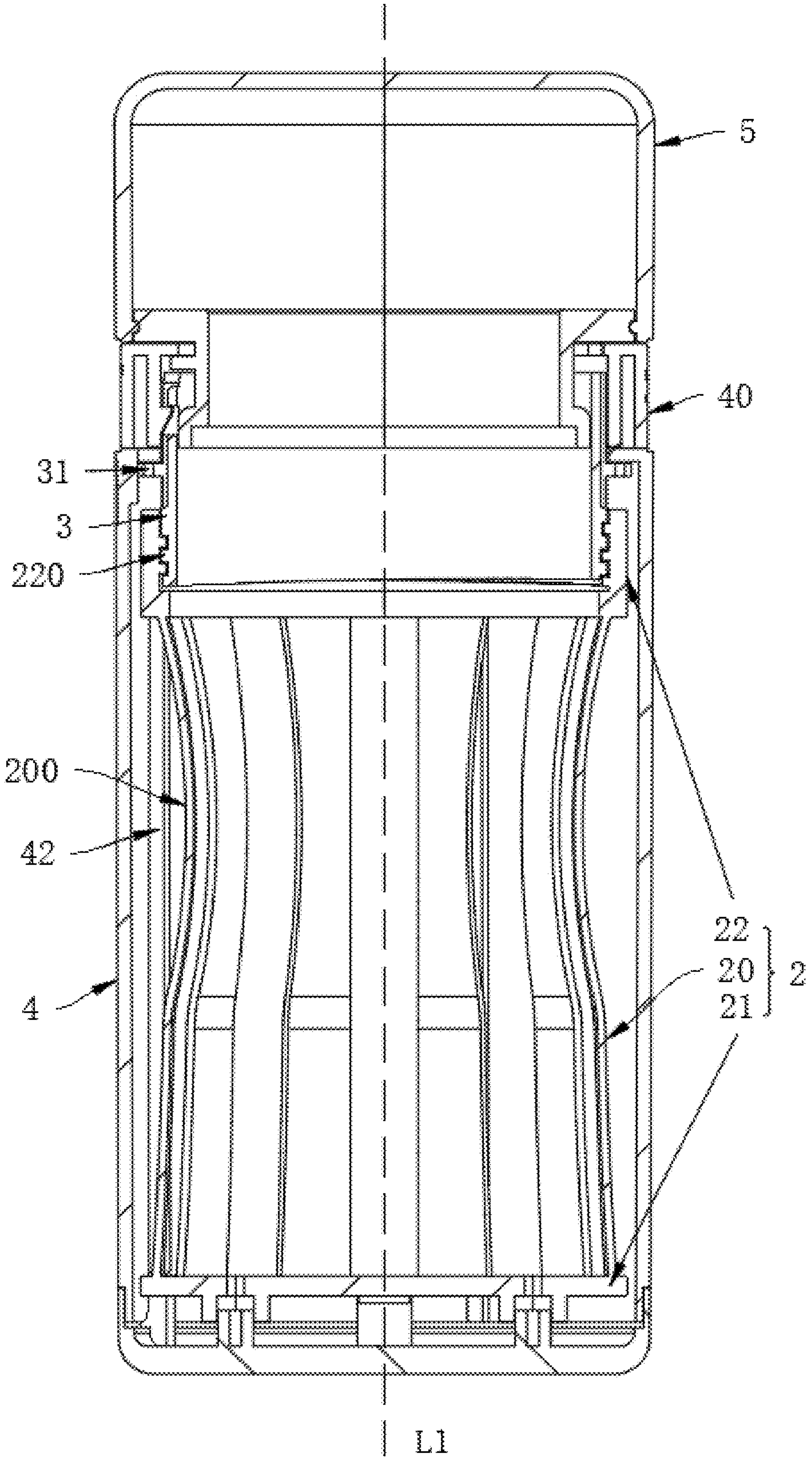
FIG. 4 is a sectional view of a portion A-A in FIG. 3 when a deformation assembly is in a relaxed state.
Figure 5:
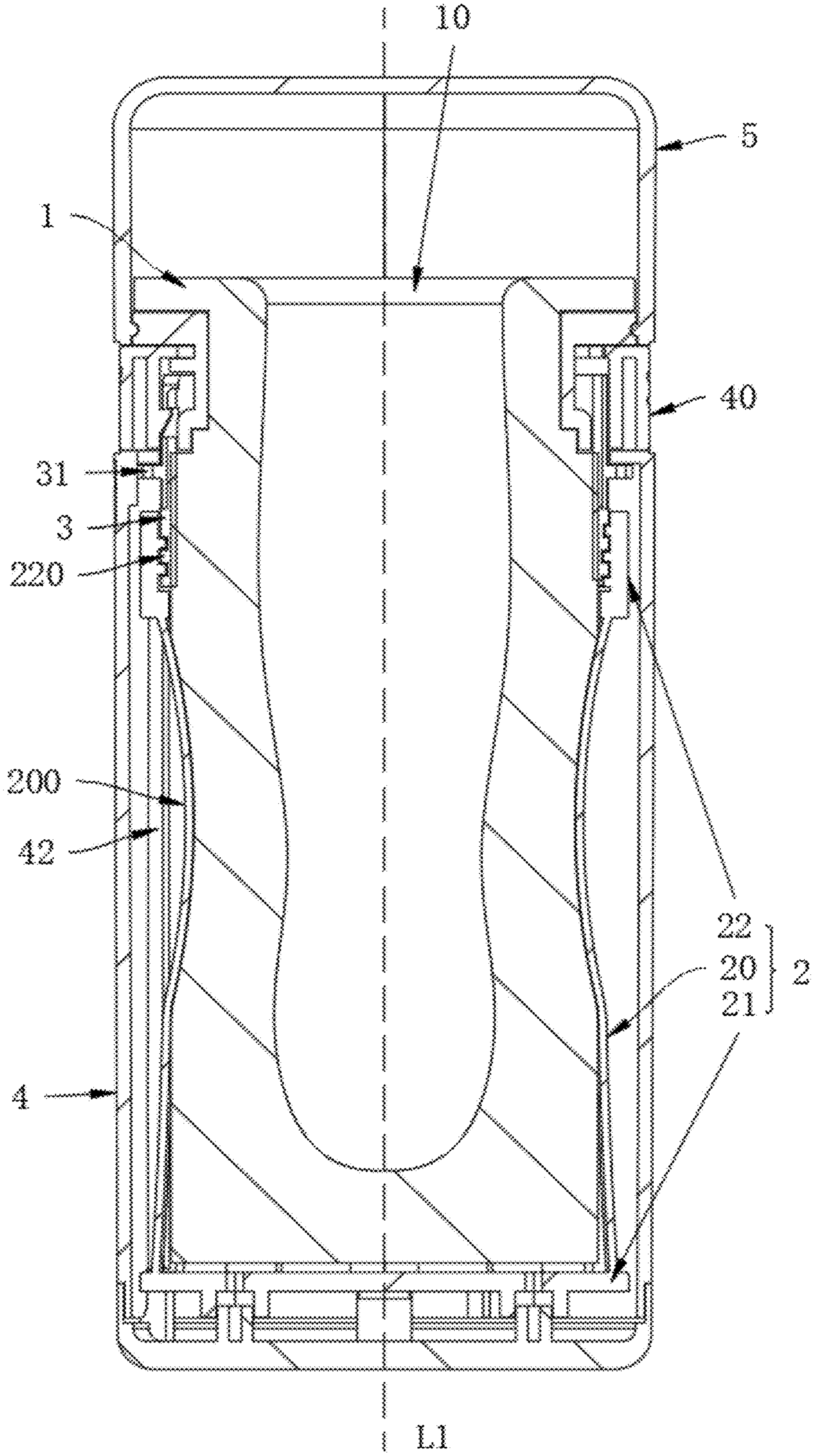
FIG. 5 is a sectional view of the portion A-A in FIG. 3 when an inner diameter of a massage sleeve is maximum.
Figure 6:
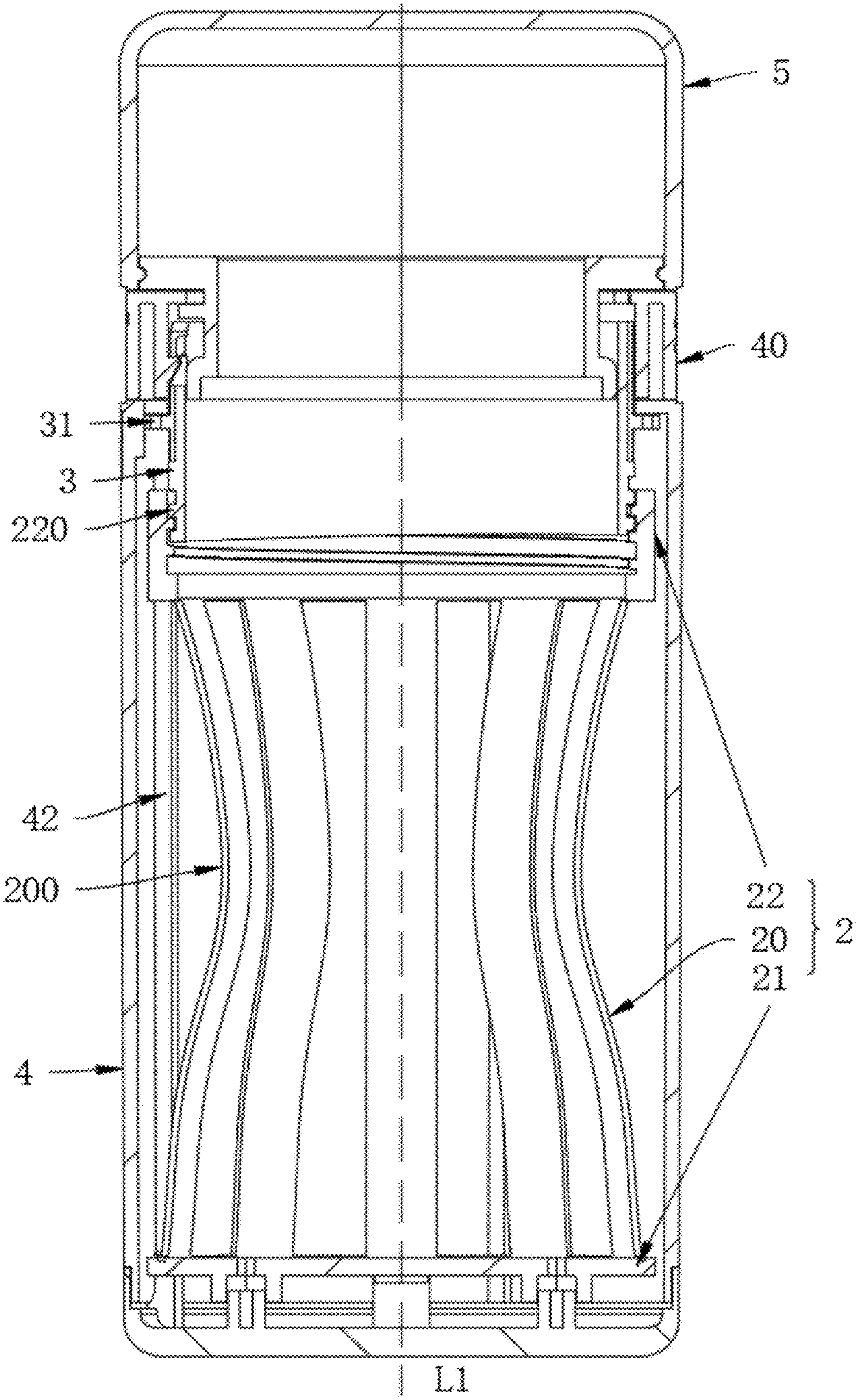
FIG. 6 is a sectional view of the portion A-A in FIG. 3 when a deformation assembly is in a contracted state.
Figure 7:
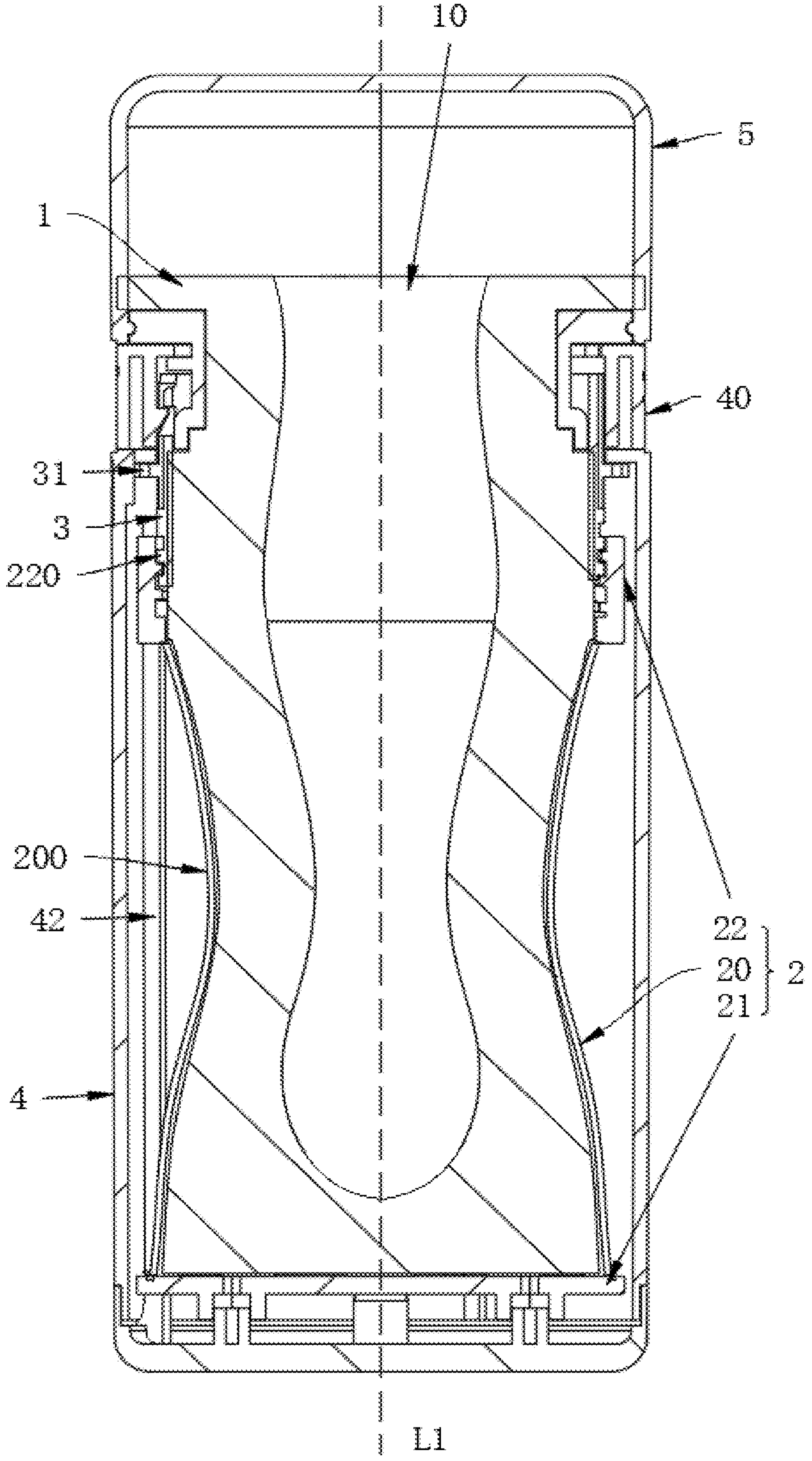
FIG. 7 is a sectional view of the portion A-A in FIG. 3 when an inner diameter of a massage sleeve is minimum.
Figure 8:
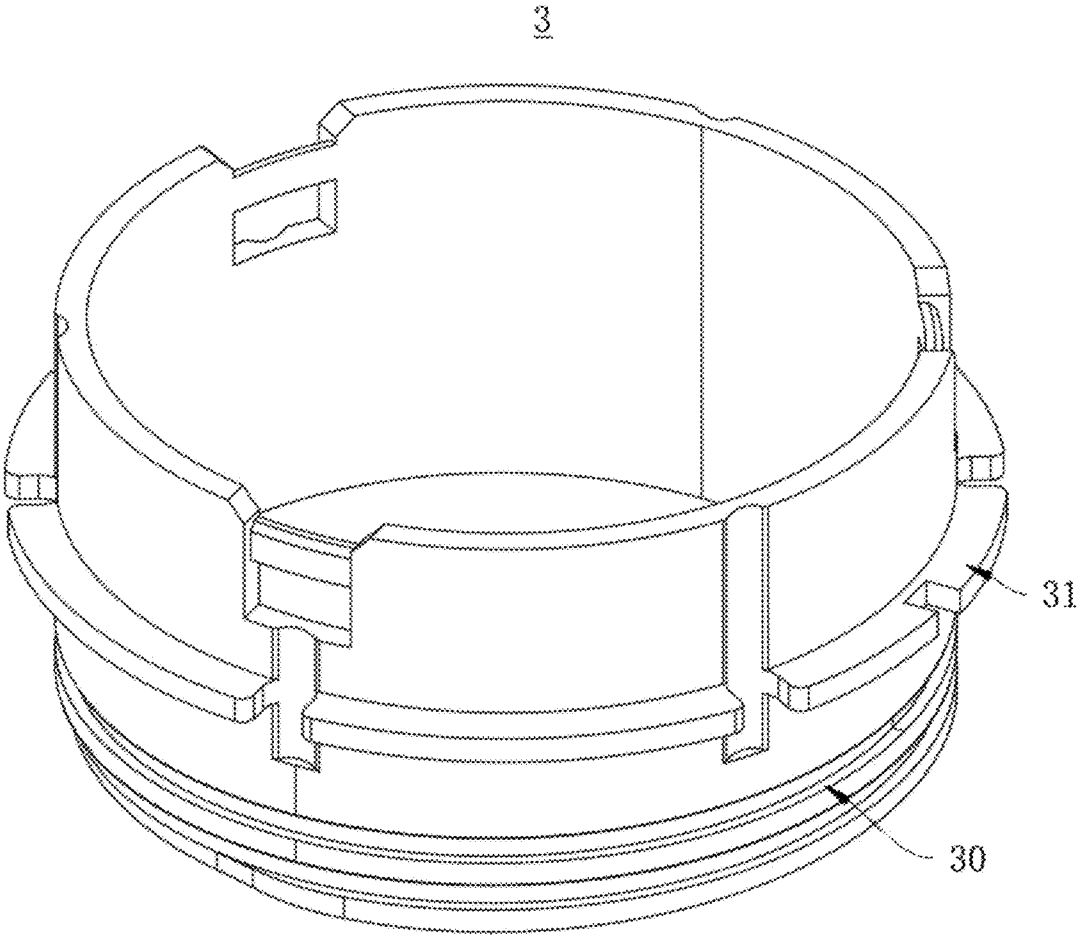
FIG. 8 is a schematic structural diagram of a rotating sleeve provided in some embodiments of the present disclosure.

Reference numerals in the figures: 1—massage sleeve; 10—inlet; 2—deformation assembly; 20—deformation portion; 200—deformation segment; 201—support segment; 2010—third limiting portion; 2011—guide surface; 2012—third engaging portion; 2013—third guide groove; 202—reset rope; 21—constraint portion; 22—first engaging portion; 220—first guide groove; 2200—second limiting portion; 221—convex block; 3—rotating sleeve; 30—second engaging portion; 31—first limiting portion; 4—cup body; 40—adjustment ring; 41—adjustable opening; 42—guide rail; 5—cover body; 6—auxiliary member; 60—second guide groove; 61—adjustment button; and 62—elastic sheet.

DETAILED DESCRIPTION OF PREFERRED EMBODIMENTS

In order to make the objectives, technical solutions and advantages of the embodiments of the present disclosure clearer, the technical solutions in the embodiments of the present disclosure will be clearly and completely described below in combination with the accompanying drawings in the embodiments of the present disclosure. Apparently, the embodiments described are merely some rather than all of the embodiments of the present disclosure. Based on the embodiments of the present disclosure, all other embodiments acquired by those of ordinary skill in the art without making creative efforts fall within the scope of protection of the present disclosure.

Unless defined otherwise, all technical and scientific terms used herein have the same meanings as commonly understood by those skilled in the art to which the present disclosure belongs. The terms used in the specification of the present disclosure are for the purpose of describing specific embodiments merely and are not intended to limit the present disclosure. The terms "including" and "having", and any variations thereof in the specification, the claims and the above accompanying drawings are intended to cover non-exclusive inclusion. The terms "first", "second" and the like in the specification and the claims or the above accompanying drawings are used to distinguish different objects and are not intended to indicate a specific order or hierarchical relationship.

When the term "example" is referred to herein, it means that specific features, structures or characteristics described in combination with the example are included in at least one example of the present disclosure. When this phrase occurs at various positions in the specification, it neither necessarily refers to the same embodiment, nor refers to an independent or alternative embodiment mutually exclusive to other embodiments. Those skilled in the art understand both explicitly and implicitly that the embodiments described herein can be combined with other embodiments.

In the description of the present disclosure, it is to be noted that, unless otherwise explicitly specified and defined, the terms “mounting”, “connected”, “connecting” and “attaching” are to be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the present disclosure may be understood according to specific circumstances.

The term “and/or” in the present disclosure, which is merely an association relation describing an associated object, means that there maybe exist three relations, for example, A and/or B maybe represent three situations: A exists alone, A and B exist at the same time, and B exists alone. In addition, the character “/” mentioned in the present disclosure generally indicates that the associated objects are in an “or” relationship.

The term “a plurality of” used in the present disclosure refers to two or more (including two), and similarly, “a plurality of groups” refers to two or more groups (including two groups), and “a plurality of sheets” refers to two or more sheets (including two sheets).

According to some embodiments of the present disclosure, optionally, as shown in FIGS. 1 to 7, the present disclosure provides a massage structure with a variable inner diameter, and the massage structure with a variable inner diameter includes a deformation assembly 2 and a rotating sleeve 3, where the deformation assembly 2 is sleeved outside a first massage area; the deformation assembly 2 includes a deformation portion 20, a constraint portion 21, and a first engaging portion 22, where the constraint portion 21 and the first engaging portion 22 are respectively disposed at both ends of the deformation portion 20 along a central axis L1 of the deformation assembly 2, and the constraint portion 21 is configured to limit the motion of the deformation portion 20; the rotating sleeve 3 is provided with a second engaging portion 30; the first engaging portion 22 and the second engaging portion 30 are linked in a coupled manner, such that a rotational motion of the rotating sleeve 3 around the axis L1 is converted into a linear reciprocating motion of the first engaging portion 22 along the axis L1; and the first engaging portion 22 moves closer to or away from the constraint portion 21 along the axis L1, which drives at least a portion of the deformation portion 20 to deform toward or away from the first massage area, thereby causing an inner diameter of the deformation assembly 2 to shrink or expand.

Mechanical components configured to perform massage actions such as vibration, swinging, and extending/retracting may be embedded in a massage sleeve 1.

In a specific implementation process, the elastic massage sleeve 1 configured to envelop the first massage area is further included; both the deformation assembly 2 and the rotating sleeve 3 are sleeved outside the massage sleeve 1, and the deformation assembly 2 is configured to provide support for the massage sleeve 1 such that an inner diameter of the massage sleeve 1 reaches a set size; and the user may directly massage the first massage area by means of the deformed deformation portion 20, or drive the inner diameter of the massage sleeve 1 to deform through the deformation of the deformation portion 20 so as to massage the first massage area.

During use, the user inserts the first massage area into the elastic massage sleeve 1, and in this case, the deformation assembly 2 provides an initial supporting inner diameter for the massage sleeve 1.

When the user wishes to increase massage pressure, the rotating sleeve 3 sleeved outside the massage sleeve 1 is rotated clockwise (or counterclockwise). The second engaging portion 30 on the rotating sleeve 3 is linked with the first engaging portion 22 of the deformation assembly 2 in a coupled manner, a rotational motion is converted into a linear motion of the first engaging portion 22 toward the constraint portion 21 along the central axis L1, and this motion forces at least a portion of the deformation portion 20 (generally a middle segment) to bend and deform toward the massage sleeve 1 in a center of the deformation assembly. The “rib-like” deformation portion 20 squeezes the massage sleeve 1 inward, such that the inner diameter of the massage sleeve 1 shrinks uniformly and continuously, the user’s first massage area is enveloped more tightly, and a required massage pressure is applied.

When wishing to reduce the pressure or remove the massage structure, the user may rotate the rotating sleeve 3 counterclockwise (or clockwise). Through a same coupling linkage mechanism, the first engaging portion 22 is driven to move away from the constraint portion 21 along the axis L1. In this case, the deformation portion 20, relying on its own elasticity or structural characteristics, progressively restores its deformation under the limiting action of the constraint portion 21, and moves in a direction away from the massage sleeve 1, such that a compressive force on the massage sleeve 1 is released, and the massage sleeve 1 is enlarged in the inner diameter and becomes loose.

The present disclosure achieves stepless adjustment of the inner diameter through continuous rotation of the rotating sleeve 3, and the user may choose a most appropriate pressure for comfortable and effective massage by finely tuning according to his/her own feeling, which brings better massage experience than the traditional stepped adjustment, and meets the personalized needs of the user for massage pressure. The presence of the deformation assembly 2 ensures that the massage sleeve 1 is not twisted or partially wrinkled during a deformation process, but achieves uniform radial contraction and expansion, such that a massage force is uniformly distributed, a massage effect and comfort are enhanced, and a structure of the massage sleeve 1 is protected, thereby prolonging the service life thereof.

In a specific implementation process, as shown in FIGS. 1 to 7, a cup body 4 with an opening is further included, the massage sleeve 1, the deformation assembly 2, and the rotating sleeve 3 are all disposed in the cup body 4, the massage sleeve 1 has an inlet 10 configured to insert the first massage area, and the inlet 10 of the massage sleeve 1 extends beyond the opening of the cup body 4; the cup body 4 is provided with a rotatable adjustment ring 40, a circle center of the adjustment ring 40 is disposed on the axis L1, and the adjustment ring 40 is snap-fitted with the rotating sleeve 3 and rotates synchronously with the rotating sleeve 3; and the rotating sleeve 3 is disposed on a side of the cup body 4 close to the opening along the axis L1, and the constraint portion 21 is fixedly connected to a bottom wall of the cup body 4 away from the opening, such that the user may use the massage structure provided by the present disclosure while holding the cup body 4, and the deformation assembly 2 is separated from the user’s hand, which prevents the deformation portion 20 from clamping or even injuring the user during deformation, and also prevents the user's hand and other body parts from affecting normal operation of the deformation assembly 2.

Specifically, as shown in FIGS. 1 and 3 to 7, a cover body 5 is further included, and the cover body 5 is fitted onto a side of the cup body 4 close to the opening to seal the inlet 10 of the massage sleeve 1, such that an internal space of the massage sleeve 1 forms an enclosed cavity.

Specifically, the adjustment ring 40 may be connected to a servo motor, or may be manually driven by the user to rotate clockwise or counterclockwise.

An outer peripheral surface of the adjustment ring 40 may be further provided with scales to assist the user in controlling the inner diameter of the massage sleeve 1.

To adapt to different body curves, the deformation portion 20 may be designed as a quickly detachable and replaceable module. For example, for a body part with plump muscles, the deformation portion 20 as a module with lower rigidity and larger deformation may be used; and for a body part with prominent bones, a rigid module providing stronger support may be used. The modular design ensures that the massage structure provided by the present disclosure adapts to various massage scenes by replacing components.

According to some embodiments of the present disclosure, optionally, as shown in FIGS. 4 to 8, the first engaging portion 22 and the second engaging portion 30 have threaded structures engaged with each other; and during coupling linkage, the rotating sleeve 3 rotates, and drives the first engaging portion 22 to perform a linear reciprocating motion along the axis L1 through threaded transmission.

Scale lines or tactile protrusions may be disposed on the rotating sleeve 3 or the first engaging portion 22. When the user rotates the rotating sleeve 3, a degree of adjustment may be quantified by observing the change of scales or feeling the detent effect during rotation, such that an interactive experience of the massage structure is enhanced.

Specifically, the first engaging portion 22 is specifically implemented as a nut or a sleeve with internal threads, and the second engaging portion 30 disposed on the rotating sleeve 3 has corresponding external threads. The two engaging portions are engaged with each other through threads.

To adjust the massage pressure, the user only needs to rotate the rotating sleeve 3. Since circumferential rotation of the first engaging portion 22 is restricted by the constraint portion 21 and/or other limiting components through the deformation assembly 2 where it is disposed, the first engaging portion cannot rotate together with the rotating sleeve 3. Therefore, a rotational motion of the rotating sleeve 3 is directly converted by a screw thread pair, which forces the first engaging portion 22 to generate a linear reciprocating motion along the central axis L1.

The threaded transmission enables an extremely high control precision, and allows the user to perform delicate and stepless pressure fine-tuning, thereby facilitating adjustment to a most appropriate massage intensity. The screw thread pair has a self-locking characteristic. Once adjusted in place, the first engaging portion 22 is inherently prevented from accidental movement due to threaded engagement without an external torsional force, thereby ensuring absolute stability of pressure during the massage process, and preventing loosening due to slight movement of the user's body. The present disclosure integrates a motion conversion mechanism on a mating surface between the rotating sleeve 3 and the first engaging portion 22, without the need for additional complex parts, such that an overall structure thereof is very compact, sturdy and durable, with high transmission efficiency and long service life.

Figure 9:
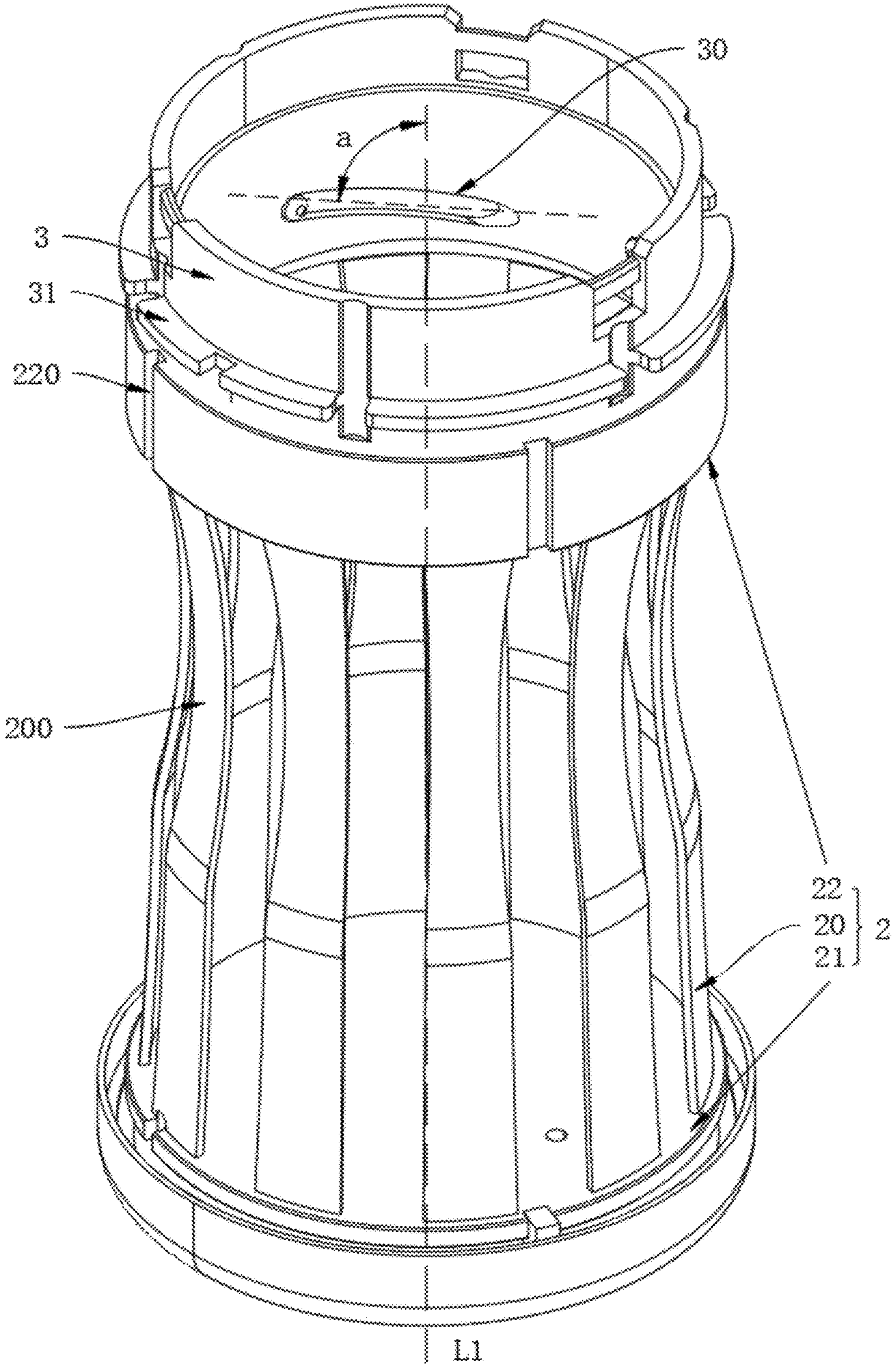
FIG. 9 is a schematic structural diagram of a deformation assembly provided in some embodiments of the present disclosure in a relaxed state.
Figure 10:
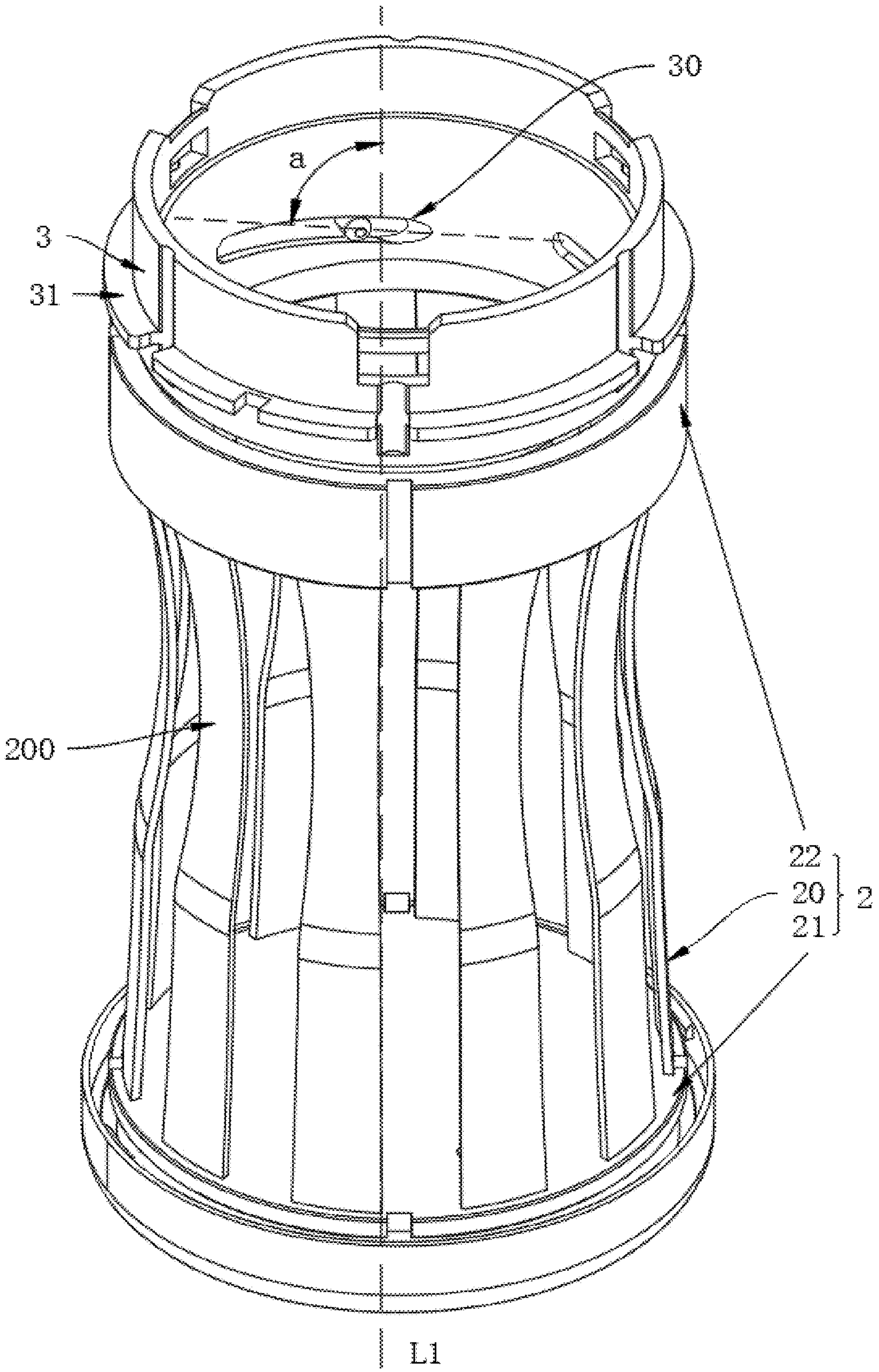
FIG. 10 is a schematic structural diagram of a deformation assembly provided in some embodiments of the present disclosure in a contracted state.
Figure 11:
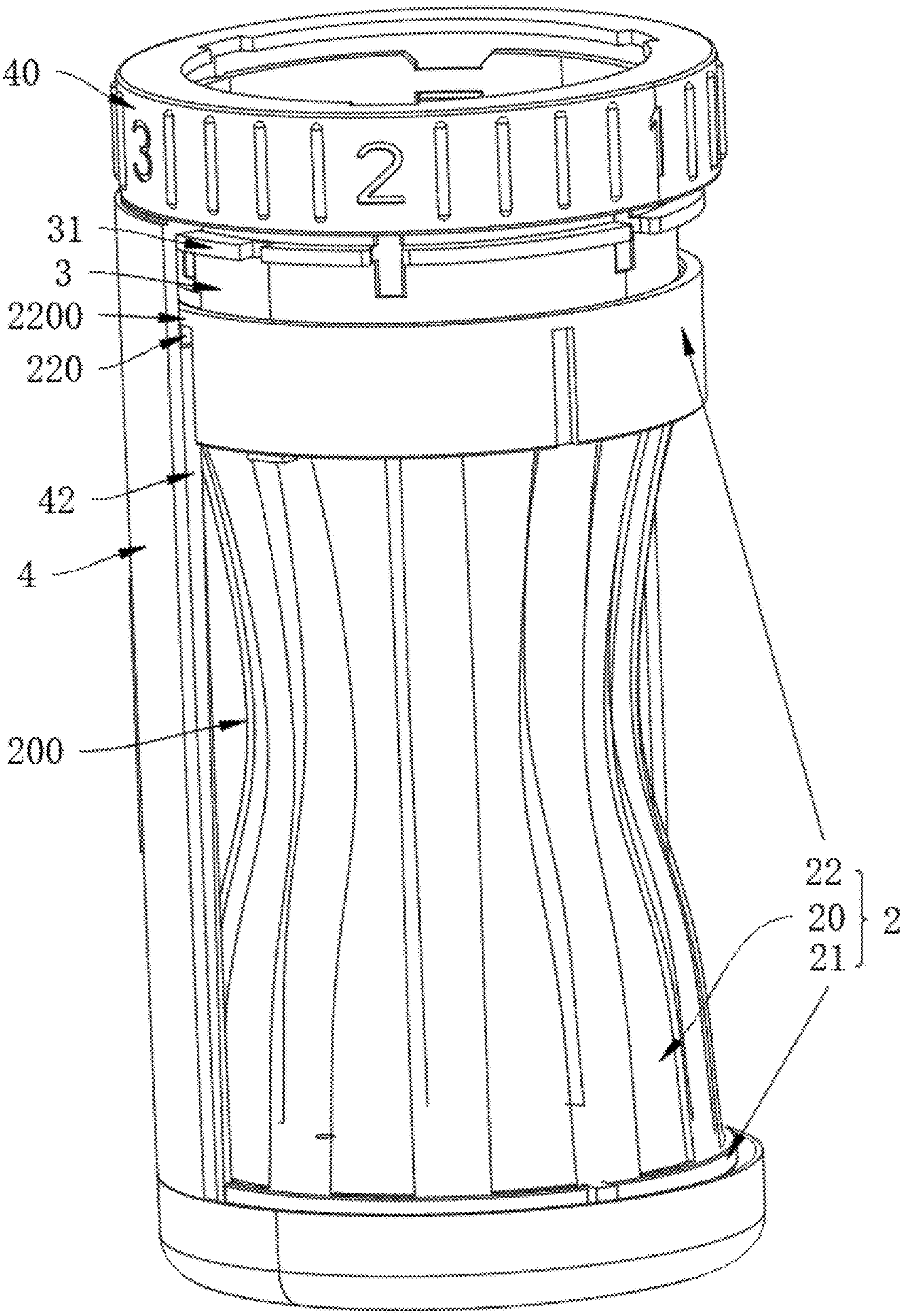
FIG. 11 is a partial sectional view of a cup body provided in some embodiments of the present disclosure.

According to some embodiments of the present disclosure, optionally, as shown in FIGS. 9 and 10, the first engaging portion 22 is a cylindrical body; the second engaging portion 30 is a waist-shaped groove; the cylindrical body is movably disposed in the waist-shaped groove, and an outer peripheral surface thereof is fitted with an inner wall of the waist-shaped groove; an included angle a is formed between a length direction of the waist-shaped groove and the axis L1, where 90°>a>0; and during coupling linkage, the rotating sleeve 3 rotates, squeezes the cylindrical body through the inner wall of the waist-shaped groove, drives the cylindrical body to move in the length direction of the waist-shaped groove, and then drives the first engaging portion 22 to perform a linear reciprocating motion along the axis L1.

The waist-shaped groove mentioned in the present disclosure is an enclosed straight groove with circular arcs at both ends. The straight groove structure ensures that the cylindrical body is always constrained in the waist-shaped groove, thereby preventing detachment of the cylindrical body during motion, and ensuring the integrity of the motion conversion mechanism.

When the user rotates the rotating sleeve 3, the obliquely arranged waist-shaped groove rotates together therewith. Since the cylindrical body is constrained and cannot rotate freely, when the waist-shaped groove rotates, an inner wall thereof continuously squeezes the cylindrical body. The compressive force may be decomposed into two component forces: one is a radial force perpendicular to the axis L1, which is offset by the inner wall of the waist-shaped groove; and the other is an axial force parallel to the axis L1. Driven by the axial force, the cylindrical body is forced to move relatively in the length direction of the waist-shaped groove. Since the waist-shaped groove is inclined, relative sliding of the cylindrical body in the groove is directly manifested as an overall linear reciprocating motion of the first engaging portion 22 along the axis L1, thereby driving the deformation of the deformation portion 20 and achieving the adjustment of the inner diameter of the massage sleeve 1.

Surface contact of cooperation between the cylindrical body and the waist-shaped groove ensures stable transmission, and enables to withstand a certain impact and vibration, thereby achieving high operation reliability. The included angle a and the smoothness of a contact surface achieve a very smooth adjustment experience with a comfortable damping effect and enhance tactile quality of the massage structure.

According to some embodiments of the present disclosure, optionally, as shown in FIGS. 4 to 7 and 9 to 11, a guide rail 42 is further included, the guide rail 42 is disposed along the axis L1; the first engaging portion 22 is provided with a first guide groove 220 that cooperates with the guide rail 42; and the cooperation between the guide rail 42 and the first guide groove 220 constrains a movement direction of the first engaging portion 22.

In practical applications, when the rotating sleeve 3 rotates and attempts to drive the first engaging portion 22 to move through the coupling linkage mechanism, the cooperation between the guide rail 42 and the first guide groove 220 plays a decisive constraining role. Such cooperation effectively limits a freedom of the first engaging portion 22, such that the first engaging portion cannot rotate circumferentially along with the rotating sleeve 3, and additionally, a motion path thereof is strictly limited to a direction parallel to the axis L1. This ensures that the first engaging portion 22 only performs a designed linear reciprocating motion without any offset or jamming, such that rotational power of a driving mechanism is efficiently and accurately converted into linear power required for adjusting the inner diameter of the massage sleeve 1.

The cooperation between the guide rail 42 and the first guide groove 220 ensures that the first engaging portion 22 moves strictly along the axis L1, which prevents mechanism jamming, wear or unsmooth adjustment caused by a motion trajectory deviation, and the inner diameter adjustment is smooth and accurate. The guide rail 42 structurally enhances the rigidity of the first engaging portion 22 when bearing a reaction force from the deformation of the deformation portion 20, prevents the first engaging portion from shaking, and enhances the stability and reliability of the entire deformation assembly 2 under load.

In a specific implementation process, as shown in FIGS. 4 to 7 and 11, the guide rail 42 is disposed on an inner wall of the cup body 4.

The guide rail 42 and the inner wall of the cup body 4 may be designed to be detachably installed. To replace or maintain the internal massage sleeve 1 or the deformation assembly 2, the guide rail 42 may be removed, and the deformation assembly 2 may be directly taken out from the cup body 4, which achieves the rapid separation and assembly of core components, and facilitates cleaning and maintenance of the massage structure.

A plurality of the guide rails 42 may be arranged, and a plurality of the first guide grooves 220 are correspondingly disposed on the first engaging portion 22.

According to some embodiments of the present disclosure, optionally, as shown in FIGS. 4 to 11, the rotating sleeve 3 is further provided with a first limiting portion 31; the first guide groove 220 is provided with a second limiting portion 2200 at an end away from the constraint portion 21 along the axis L1; the first engaging portion 22 has two limit positions when performing a linear reciprocating motion along the axis L1; at one of the limit positions, the first engaging portion 22 is blocked by the first limiting portion 31; and at the other limit position, the second limiting portion 2200 is blocked by the guide rail 42.

The first limiting portion 31 acts on the first engaging portion 22 and limits its movement away from the constraint portion 21; and the second limiting portion 2200 acts on the fixed guide rail 42, and limits the first engaging portion 22 to move toward the constraint portion 21 through the cooperation between the guide rail 42 and the first guide groove 220. The two limiting portions cooperate to jointly define a complete motion stroke of the first engaging portion 22.

An elastic buffer material (such as a rubber pad or a silicone member) may be added to a contact surface of the first limiting portion 31 and/or the second limiting portion 2200. When the first engaging portion 22 moves to the limit position, the first engaging portion 22 or the guide rail 42 comes into contact with a buffer member, which effectively absorbs impact energy and reduces noise.

Specifically, the first limiting portion 31 is disposed on the rotating sleeve 3, which may be an inwardly protruding boss or stopper block. Additionally, the first guide groove 220 is provided with the second limiting portion 2200 at an end away from the constraint portion 21 along the axis L1, and may be a widened groove edge or a special stopper plate.

When the user rotates the rotating sleeve 3 for adjustment, the first engaging portion 22 moves along the axis L1, and its stroke is automatically terminated at two limit positions:

At a minimum inner diameter position: When the first engaging portion 22 moves to an endpoint toward the constraint portion 21, the fixed guide rail 42 comes into contact with the second limiting portion 2200, and the guide rail 42 is blocked by the second limiting portion 2200. In this case, the user feels resistance to rotation, indicating that the inner diameter of the massage sleeve 1 has shrunk to a minimum allowable design value.

At a maximum inner diameter position: When the first engaging portion 22 moves to the endpoint away from the constraint portion 21, a body thereof or a structure fixedly connected thereto comes into contact with the first limiting portion 31 on the rotating sleeve 3 and is blocked thereby. In this case, the user feels that a rotation resistance increases significantly and rotation cannot continue, indicating that the inner diameter of the massage sleeve 1 has expanded to a maximum allowable design value.

A limiting mechanism prevents structural damage such as excessive deformation and component fracturing of the deformation portion 20 caused by excessive rotation by the user, enhances the durability and reliability of the massage structure, ensures that the inner diameter of the massage sleeve 1 always changes within a preset safe and effective range, and prevents the failure of massage pressure or damage to a body of the massage sleeve 1 caused by range exceeding.

According to some embodiments of the present disclosure, optionally, as shown in FIGS. 4, 6, 9, and 10, the deformation portion 20 has a strip-shaped structure; and a plurality of the deformation portions 20 are arranged, and all the deformation portions 20 are disposed circumferentially around the massage sleeve 1.

The number of the deformation portions 20 is not less than six.

A cross-section of either of the deformation portions 20 may be, but not limited to, rectangular, circular, elliptical or irregular.

When the first engaging portion 22 is driven to move along the axis L1, the first engaging portion simultaneously acts on a same end of either of the plurality of the deformation portions 20 disposed around the massage sleeve 1. Under the constraint of both ends (the constraint portion 21 and the first engaging portion 22), the deformation portions 20 synchronously and uniformly deform toward or away from the central axis L1. This mode of synchronous action at multiple points in a circumferential direction ensures that the deformation portions uniformly squeeze or release the middle massage sleeve 1 from all directions, thereby ensuring concentric and uniform contraction and expansion of the inner diameter of the massage sleeve 1, rather than unilateral or asymmetric deformation.

The circumferential arrangement of the plurality of the deformation portions 20 ensures that the massage sleeve 1 shrinks uniformly during adjustment and pressure is applied to a wrapped body part in an encircling-type and uniformly distributed manner, which prevents discomfort caused by single-point pressure concentration, and enhances the comfort and effect of massage. The plurality of the strip-shaped deformation portions 20 collectively form a stable frame structure, which significantly enhances the rigidity of the entire deformation assembly 2, and ensures that the deformation assembly is less prone to instability or distortion when bearing a reaction force from the internal massage sleeve 1, thereby ensuring the reliability of long-term use.

According to some embodiments of the present disclosure, optionally, as shown in FIGS. 4 to 7 and 9 to 11, the deformation portion 20 includes a deformation segment 200; and when the deformation portion 20 deforms toward the massage sleeve 1 to shrink the inner diameter of the massage sleeve 1, the deformation segment 200 constitutes a main deformation occurrence area.

The fact that the deformation segment 200 is the main deformation occurrence area of the deformation portion 20 does not mean that other portions of the deformation portion 20 are absolutely not deformed, but that under the action of a same internal force, strain (deformation per unit length) of the deformation segment 200 is much larger than that of other portions. Macroscopically, actions such as bending and arching mainly occur in this area.

When the user rotates the rotating sleeve 3 to drive the first engaging portion 22 to move, which forces the entire deformation portion 20 to bend and deform toward the massage sleeve 1 to shrink the inner diameter, most of bending and shape changes are concentrated in the preset deformation segment 200. The deformation segment 200 becomes the main deformation occurrence area of the deformation portion 20 under stress, while other portions of the deformation portion 20 maintain relatively greater rigidity and mainly play the role of force transmission and support.

By presetting a position of the deformation segment 200, the present disclosure accurately controls a main action point where pressure is applied to the massage sleeve 1. This design enables a massage force to act more accurately on specific muscle groups or acupoints of a body part, thereby enhancing the massage effect. Concentrating the deformation on the designed deformation segment 200 prevents unpredictable stress concentration and fatigue damage in other areas of the deformation portion 20. Equivalently, a safe bending zone is set for the deformation portion 20, which not only ensures functional realization but also greatly enhances the durability and reliability of the entire deformation assembly 2.

In a specific implementation process, the deformation segments 200 of the plurality of the deformation portions 20 circumferentially arranged may be designed at different heights, such that when the first engaging portion 22 moves toward the constraint portion 21, the deformation segments 200 at different heights may be activated, and pressing massage experiences at different positions of the first massage area are provided.

According to some embodiments of the present disclosure, optionally, material hardness of the deformation segment 200 is less than material hardness of any other portion of the deformation portion 20.

During manufacturing of the deformation portion 20, material hardness of an area preset as the deformation segment 200 on the deformation portion 20 may be specifically set to be less than material hardness of any other portion of the deformation portion 20 through two-shot injection molding, insert molding or local heat treatment.

When the first engaging portion 22 moves and forces the entire deformation portion 20 to deform, the deformation segment 200, made of a softer and more flexible material, preferentially bends or twists under stress. In contrast, other portions of the deformation portion 20, due to higher material hardness and stronger rigidity, exhibit very minimal deformation. As such, the deformation of the entire deformation portion 20 is naturally concentrated and guided to the softer deformation segment 200, such that the deformation segment stably becomes the main deformation occurrence area.

The present disclosure controls a deformation position by utilizing mechanical properties of material, and ensures that deformation of each massage structure occurs accurately in a predetermined area every time when used, thereby ensuring the consistency of massage structure performance. The soft deformation segment 200 better absorbs and disperses the stress generated during a deformation process, and prevents occurrence of a stress peak at a junction between a rigid portion and the deformation segment 200, thereby improving the fatigue resistance of the deformation portion 20 and prolonging the service life thereof.

In a specific implementation process, the deformation segment 200 may be designed to have non-uniform hardness but exhibits a gradient change. For example, hardness of the deformation segment 200 progressively decreases from a portion close to an edge of the deformation segment 200 to a center of the deformation segment 200. This design achieves smoother and more natural deformation transition, and further optimizes the stress distribution, such that an inwardly protruding shape better conforms to ergonomic curves.

According to some embodiments of the present disclosure, optionally, in a direction perpendicular to the axis L1, a cross-sectional dimension of the deformation segment 200 is smaller than that of any other portion of the deformation portion 20.

The cross-sectional dimension mentioned in the present disclosure may refer to a width and thickness of the deformation portion 20 or a section modulus comprehensively reflecting bending resistance. As long as one or a combination of these geometric parameters of the deformation segment 200 is smaller than that of any other portion thereof, an effect of stiffness weakening may be achieved.

When a component bends under stress, its stiffness is directly related to a cross-sectional dimension (such as a moment of inertia). The smaller cross-sectional dimension results in lower stiffness and easier deformation. Therefore, when the first engaging portion 22 moves and forces the entire deformation portion 20 to bear load, the deformation segment 200 with a smaller cross-sectional dimension preferentially and mainly bends and deforms at this location due to minimum local stiffness, thereby stably becoming the main deformation occurrence area.

The present disclosure controls a deformation position of the deformation portion 20 through geometric dimension control, which is reliable and has good repeatability, thereby ensuring the consistency and predictability of massage structure performance.

Figure 13:
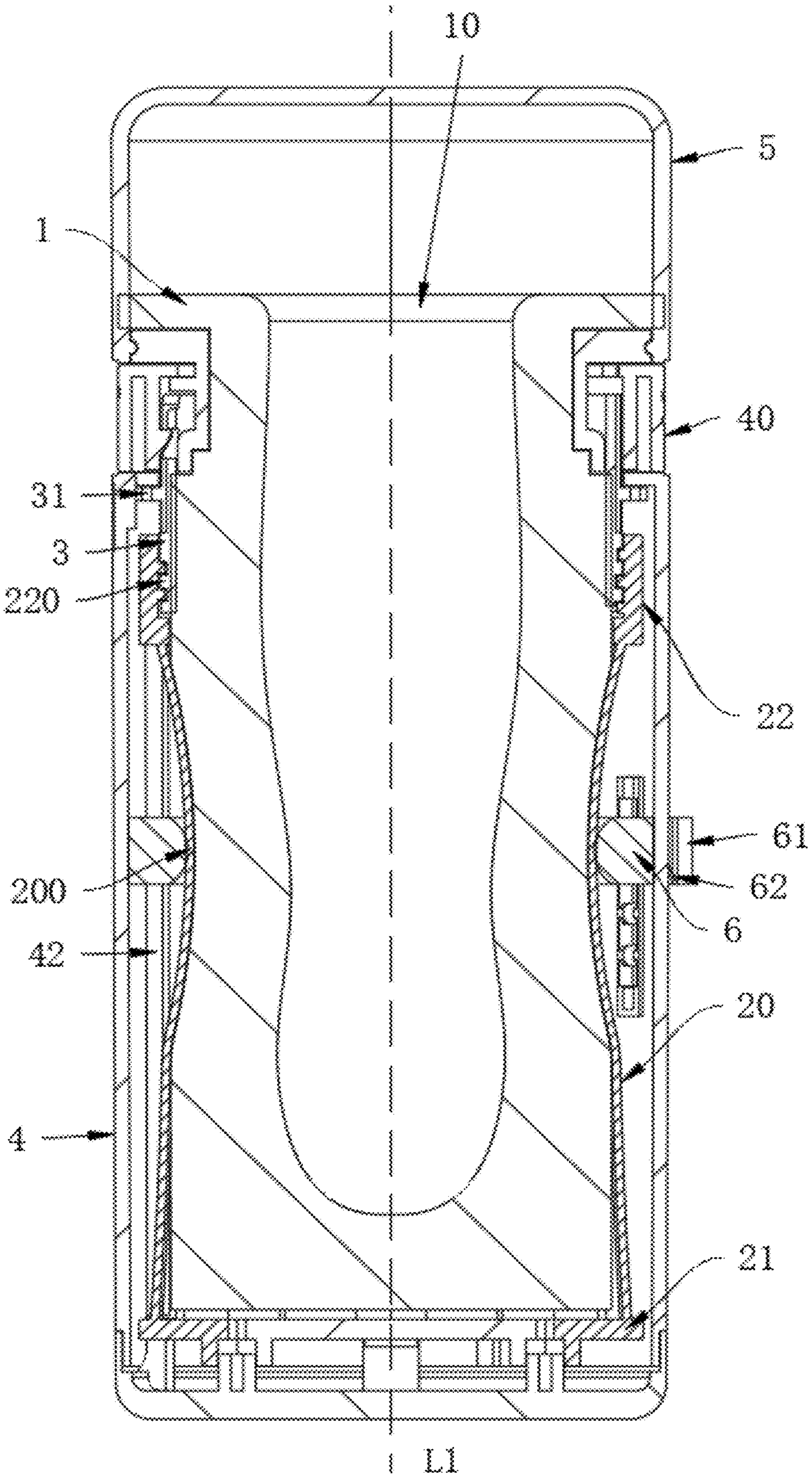
FIG. 13 is a sectional view of a massage structure with a variable inner diameter including an auxiliary member provided in some embodiments of the present disclosure.
Figure 14:
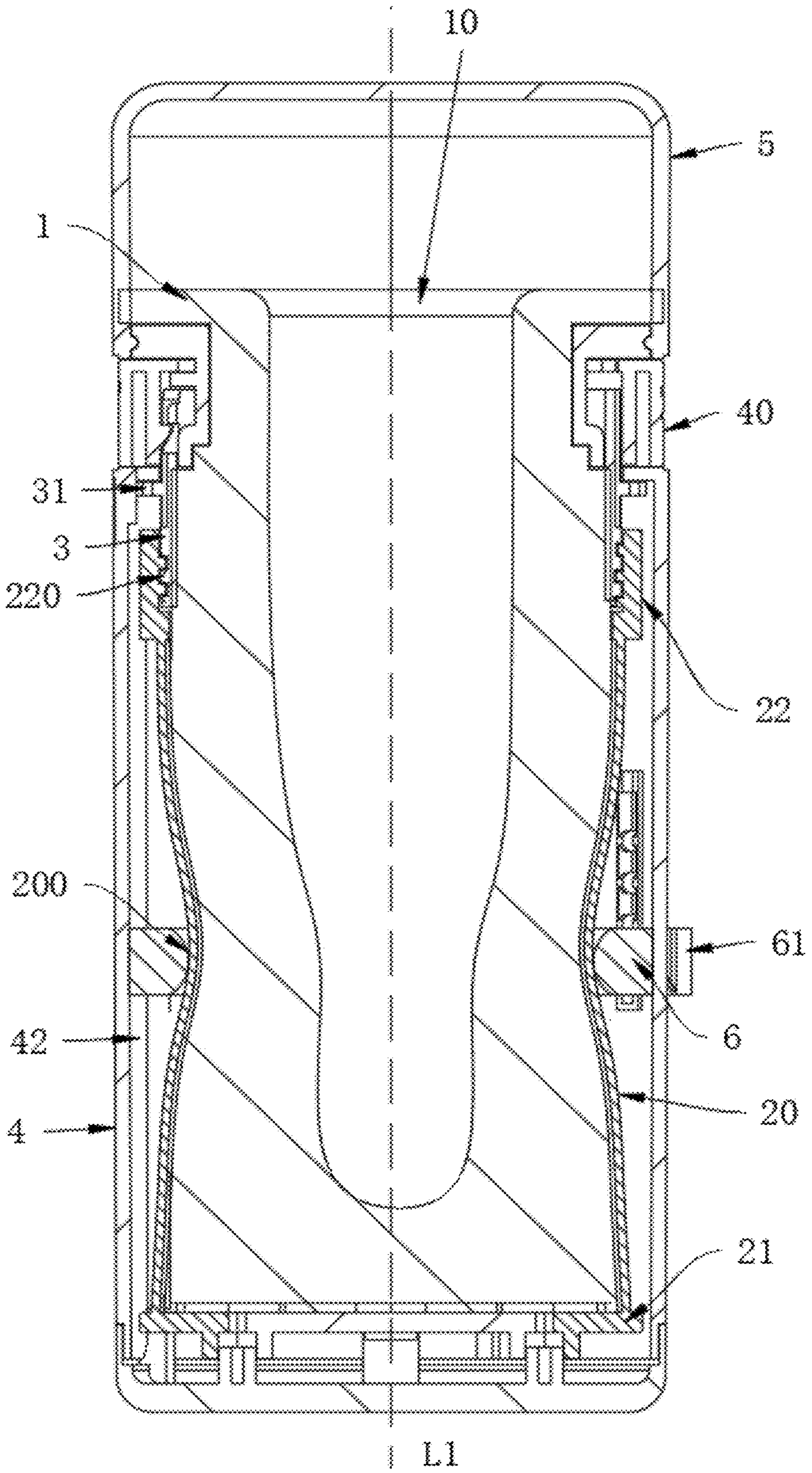
FIG. 14 is a sectional view of a massage structure with a variable inner diameter provided in some embodiments of the present disclosure after a position of an auxiliary member is changed.

According to some embodiments of the present disclosure, optionally, as shown in FIGS. 13 and 14, an auxiliary member 6 is further included, the auxiliary member 6 is sleeved outside all the deformation portions 20 and configured to push the corresponding deformation portion 20 to protrude toward the massage sleeve 1; and the deformation segment 200 is a portion of the deformation portion 20 corresponding to the auxiliary member 6.

In practical applications, when the deformation assembly 2 tends to undergo overall deformation due to the movement of the first engaging portion 22, the auxiliary member 6 as an independent adjustment unit starts to play a role. Due to inward extrusion by the auxiliary member 6, the deformation segment 200 covered thereby is pre-applied or additionally applied with an inward force, such that a more prominent protrusion is generated in this local area, and when the deformation portion 20 deforms under the pushing action of the first engaging portion 22, an area that has already deformed is more likely to further deform than other areas, such that the deformation of the support segment 201 is more concentrated on the deformation segment 200 that the auxiliary member 6 acts on.

Figure 15:
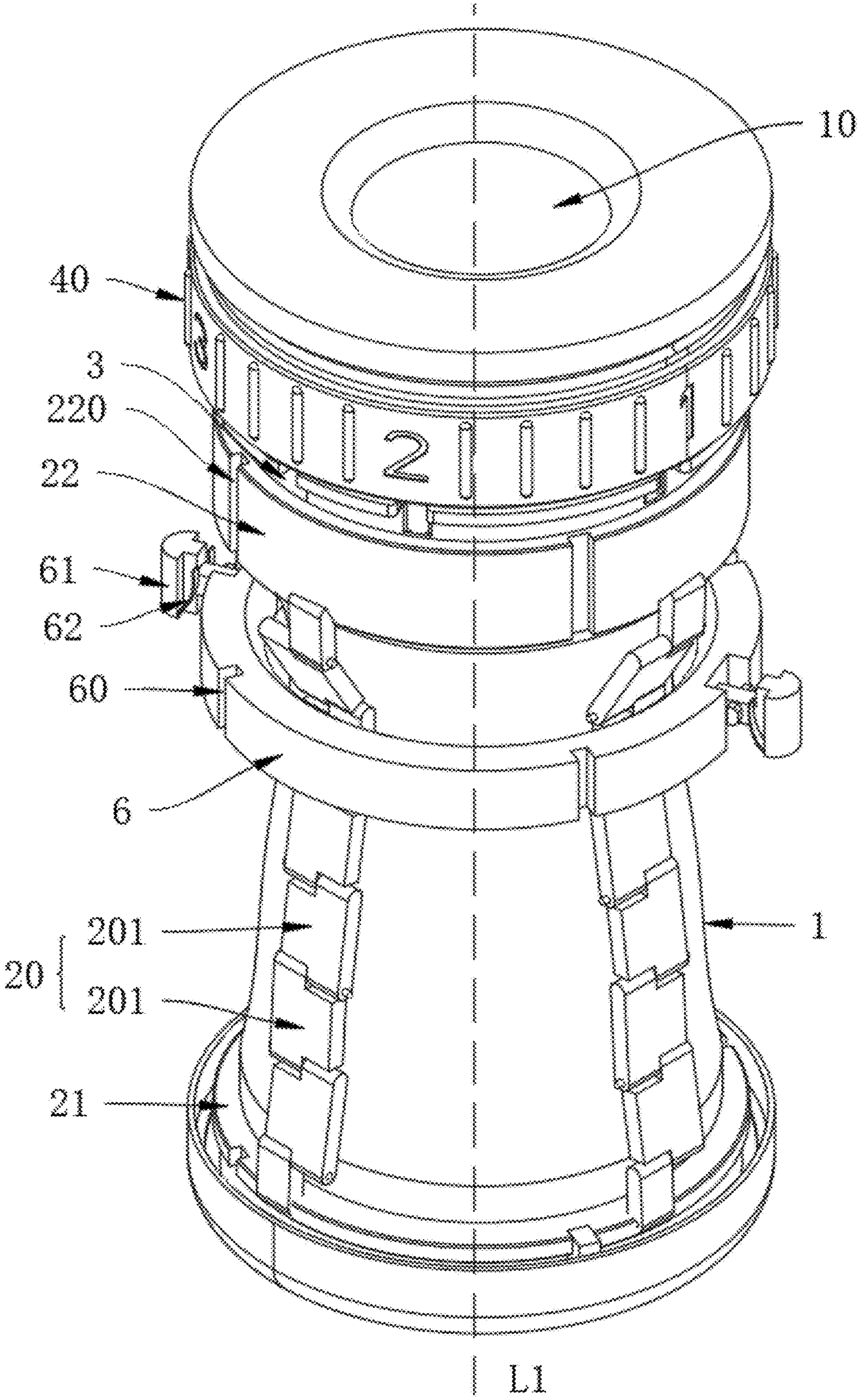
FIG. 15 is a schematic diagram of a partial structure of a massage structure with a variable inner diameter provided in some embodiments of the present disclosure.

According to some embodiments of the present disclosure, optionally, as shown in FIG. 15, the auxiliary member 6 is provided with a second guide groove 60 adapted to the guide rail 42; and the auxiliary member 6 is configured to move along the axis L1 to adjust an acting position on the deformation segment 200 of the deformation portion 20.

When needing to adjust a concentrated pressure point of massage, the user may directly operate the auxiliary member 6 to move it along the axis L1. Due to the cooperation between the guide rail 42 and the second guide groove 60, the movement of the auxiliary member 6 is limited to a direction parallel to the axis L1, without deflection or jamming. By changing a position of the auxiliary member 6 in an axial direction, the user may adjust the acting position on the deformation segment 200 of the deformation portion 20, thereby achieving precise positioning and pressing of different muscle groups.

A guide structure of the guide rail 42 ensures the accuracy of linear movement of the auxiliary member 6, such that the user accurately positions a protruding effect of the deformation segment 200 to a specific position of a body part, thereby achieving precise control of a massage height. The guide structure prevents the auxiliary member 6 from shaking or rotating during the movement process, ensures the stability and tactile smoothness of adjustment, and enhances the tactile quality and user experience of the massage structure.

Figure 12:
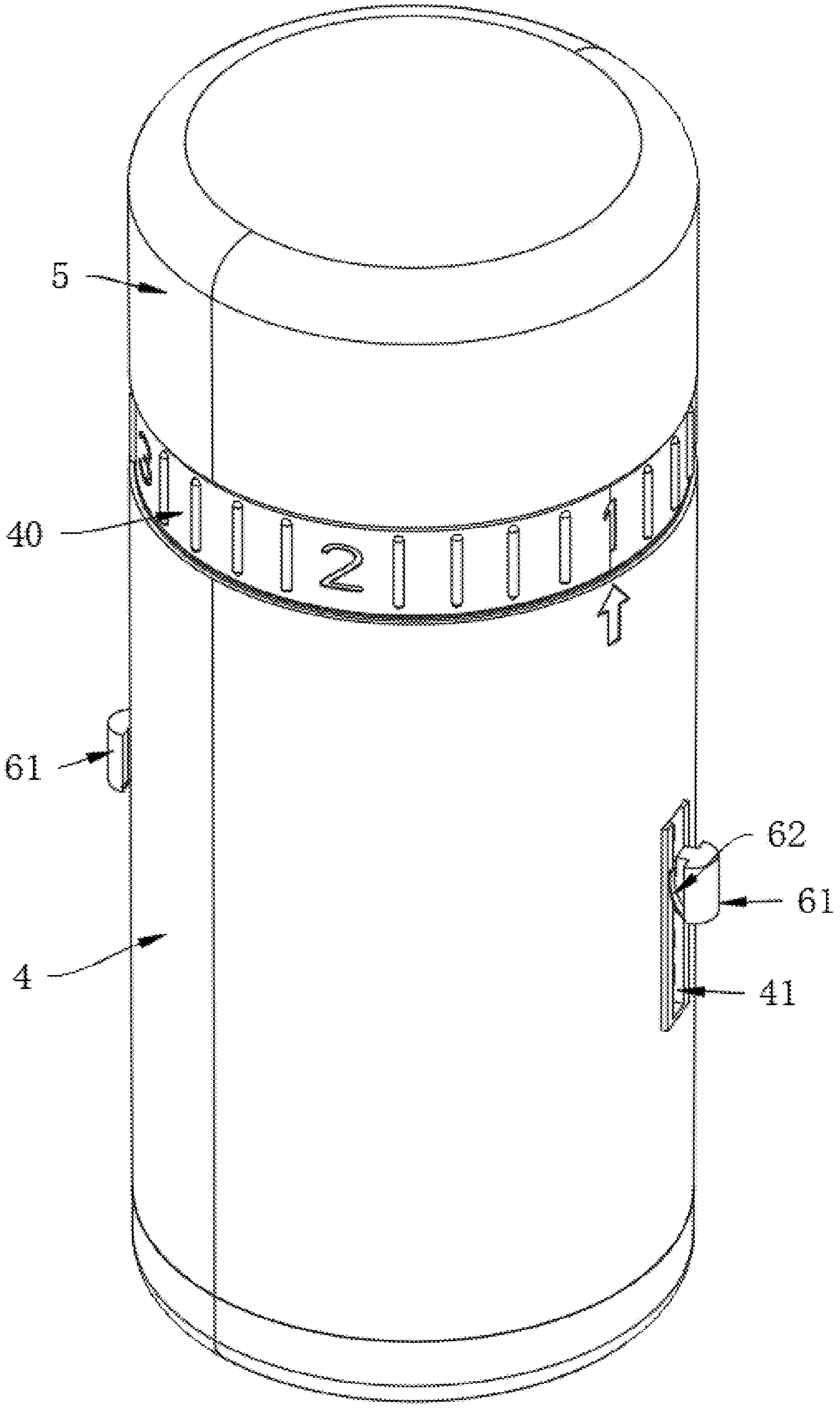
FIG. 12 is a schematic diagram of an external structure of a cup body provided with an adjustable opening provided in some embodiments of the present disclosure.

In a specific implementation process, as shown in FIGS. 12 to 14, a surface of the cup body 4 is provided with an adjustable opening 41 that extends along the axis L1, and an outer peripheral surface of the auxiliary member 6 is fitted with the inner wall of the cup body 4 and is provided with an adjustment button 61, where the adjustment button 61 extends through the adjustable opening 41 to protrude from the cup body 4, and the user may drive the auxiliary member 6 to move along the axis L1 by pushing the adjustment button 61 so as to adjust a position of the deformation segment 200; and further, an inner wall of the adjustable opening 41 is fitted with the adjustment button 61, and the adjustment button 61 is further provided with an elastic sheet 62 configured to abut against an outer surface of the cup body 4, where the elastic sheet 62 limits the auxiliary member 6 from spontaneously moving along the cup body 4 by abutting against the cup body 4.

Figure 16:
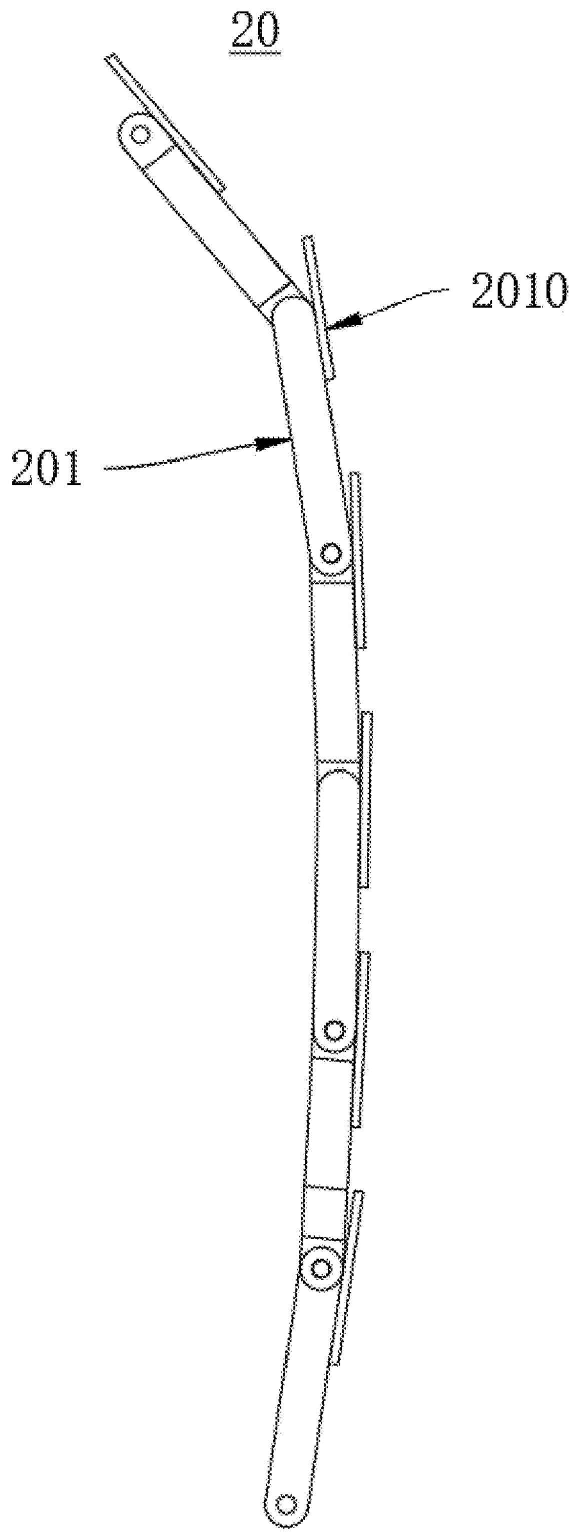
FIG. 16 is a schematic structural diagram of a deformation portion provided in some embodiments of the present disclosure.
Figure 17:
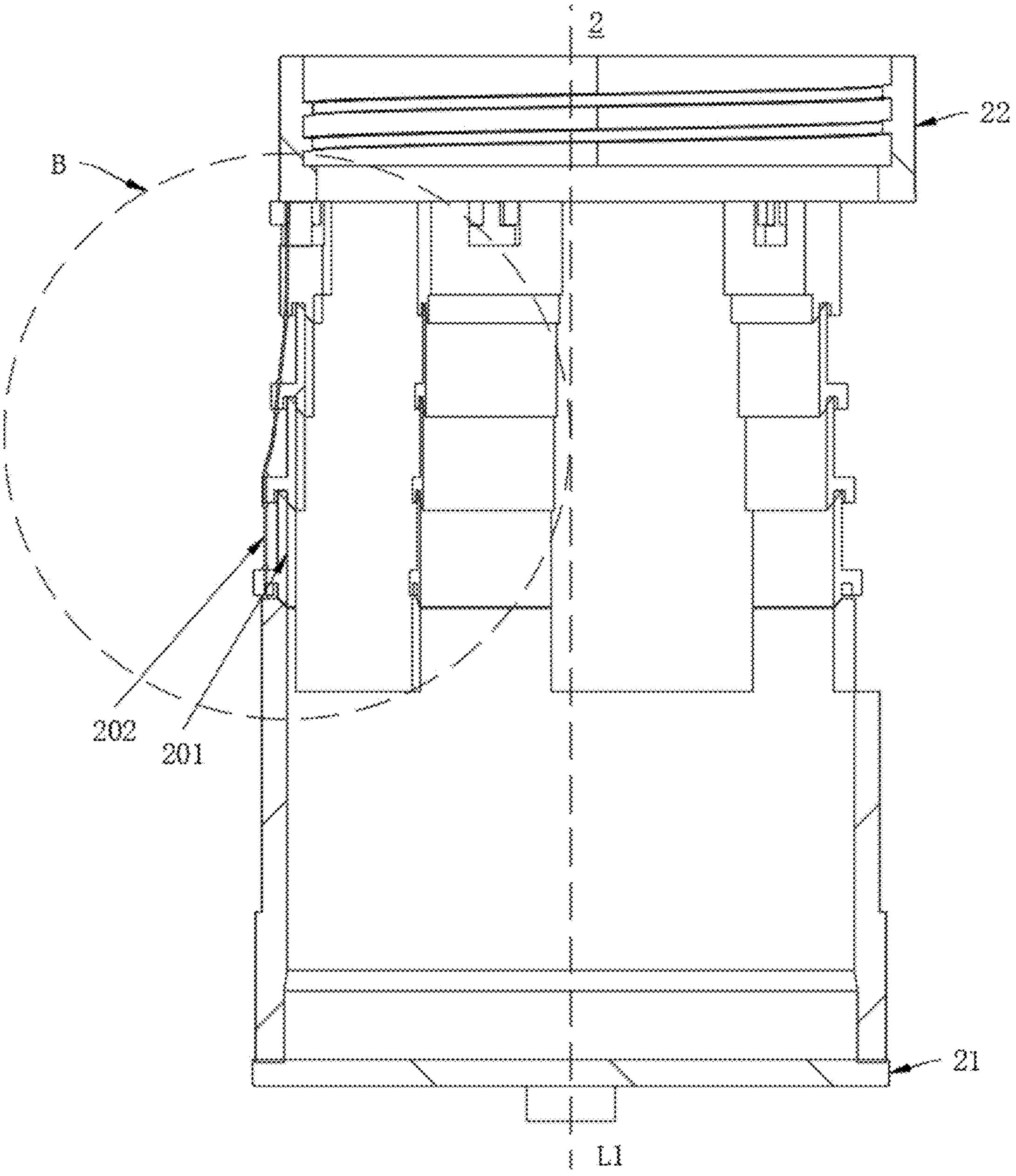
FIG. 17 is a sectional view of a deformation assembly when a plurality of support segments overlap in a radial direction of a massage sleeve provided in some embodiments of the present disclosure.
Figure 18:
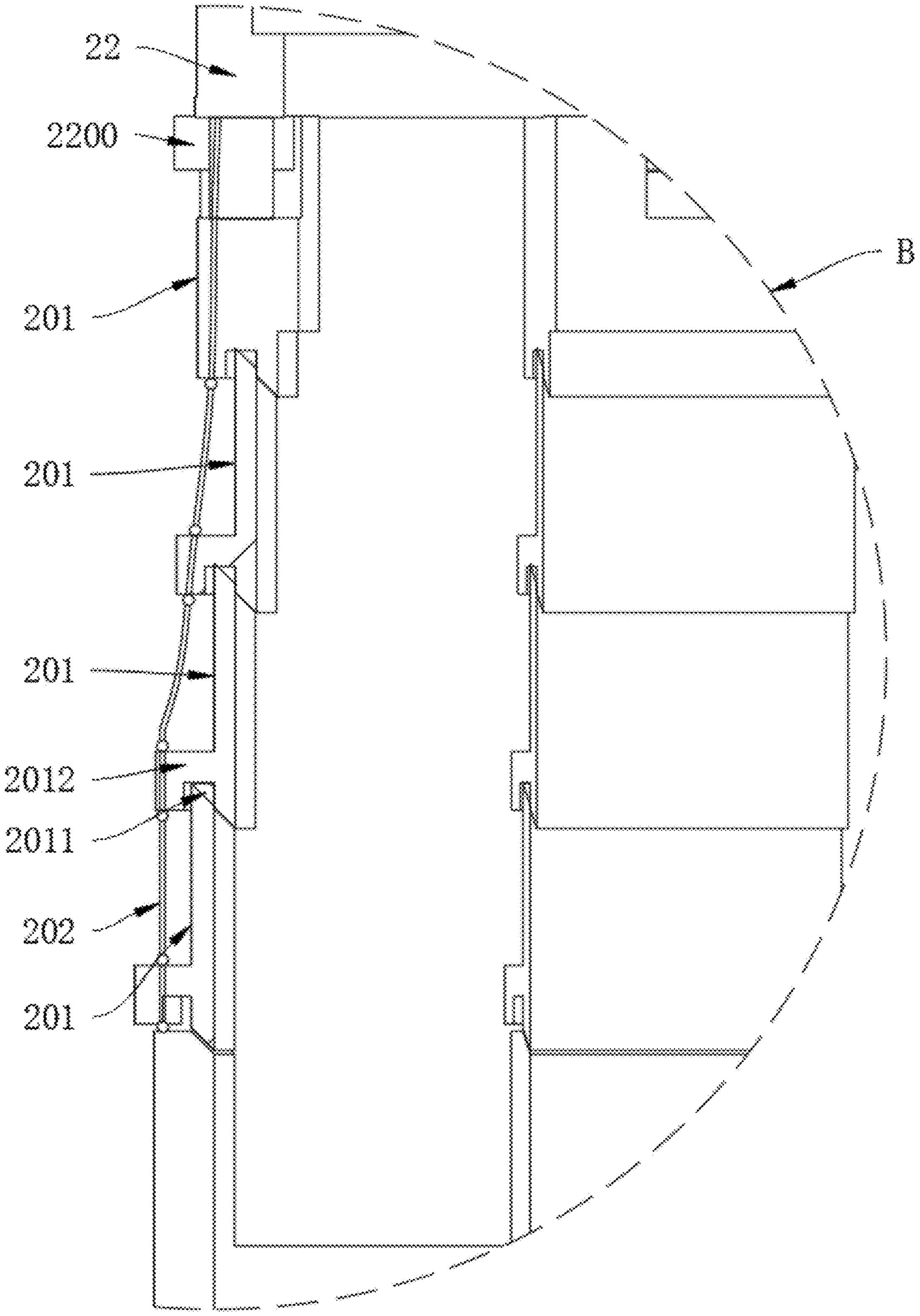
FIG. 18 is an enlarged view of a portion B in FIG. 17.
Figure 19:
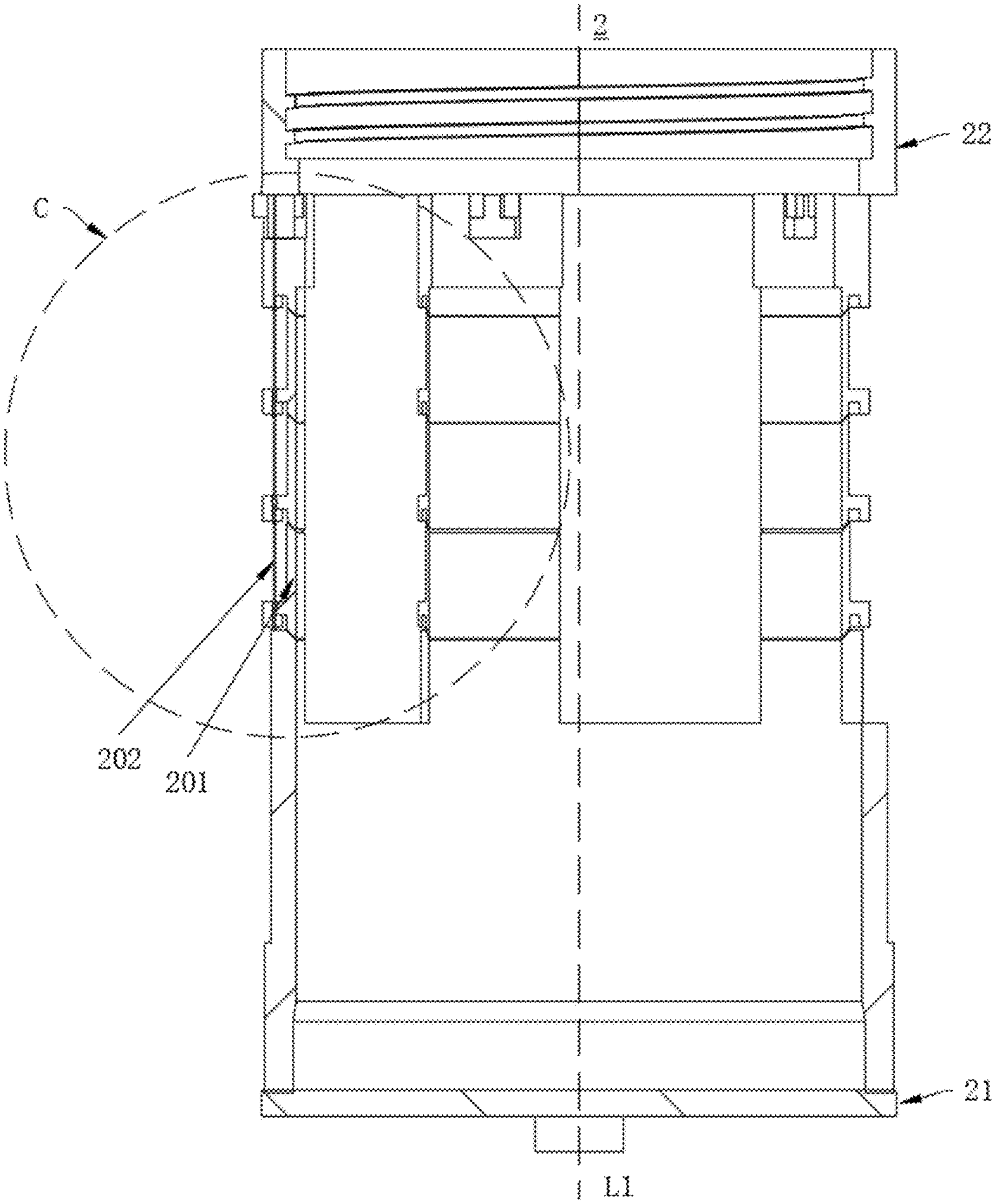
FIG. 19 is a schematic diagram of a plurality of support segments reset to a flush state provided in some embodiments of the present disclosure.
Figure 20:
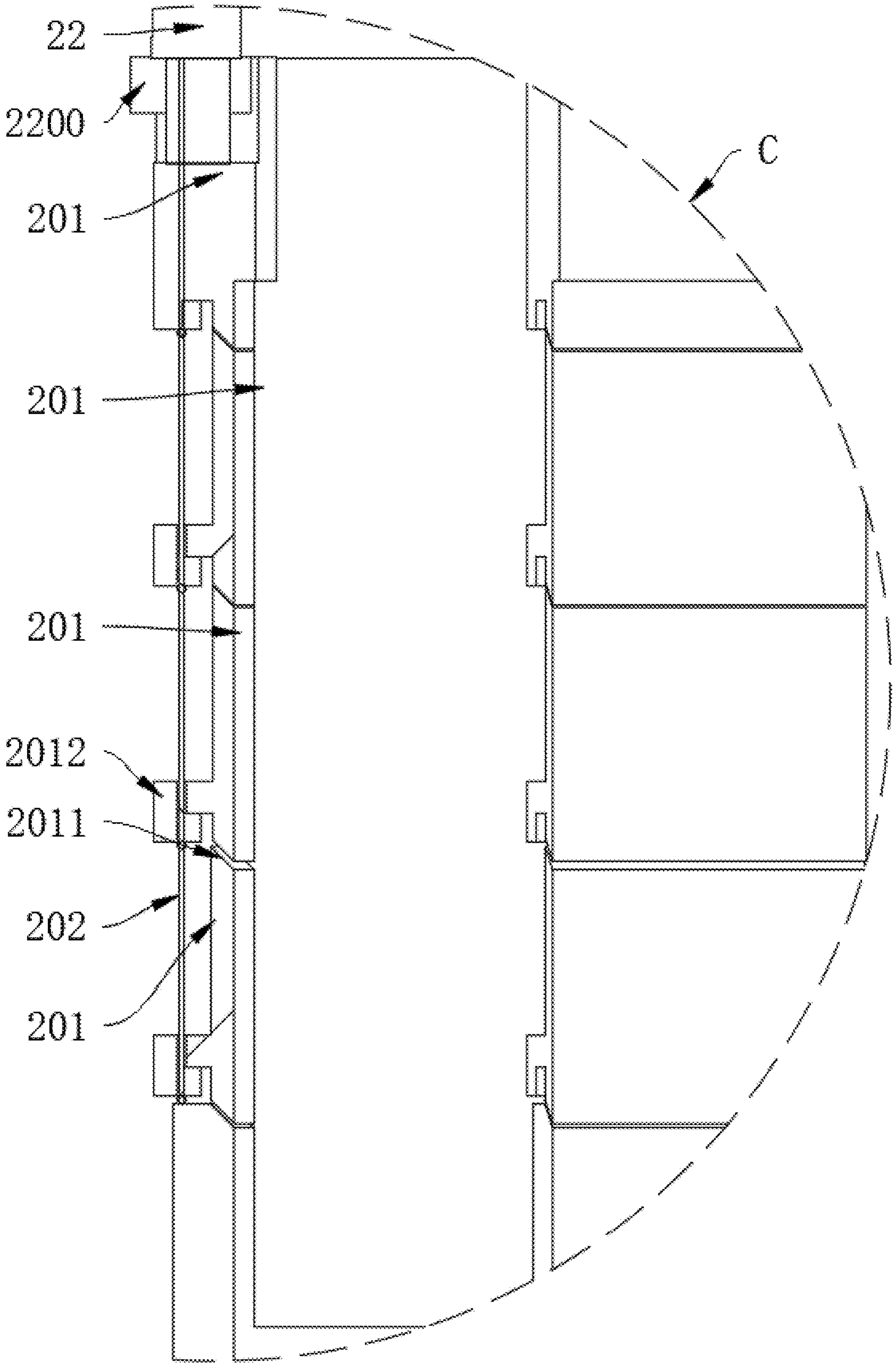
FIG. 20 is an enlarged view of a portion C in FIG. 19.

According to some embodiments of the present disclosure, optionally, as shown in FIGS. 15 and 16, the deformation portion 20 is composed of a plurality of support segments 201 hingedly connected end to end.

When the first engaging portion 22 moves along the axis L1, the entire chain-shaped deformation portion 20 is pulled to extend and retract. Additionally, the auxiliary member 6 sleeved outside the deformation portion 20 squeezes one or more of the support segments 201 corresponding to a position thereof. Since the support segments 201 are hinged to each other, the support segments, under a thrust of the auxiliary member 6, rotate relatively at hinge points, such that one or more sharp-angled, precisely directed protrusions are formed locally. This structure enables to change the deformation of the deformation portion 20 from overall and continuous bending to local and discrete rotation, thereby pushing the massage sleeve 1 to generate corresponding protrusions more accurately.

Each of the support segments 201 hinged to each other independently generates a separate protrusion under the action of the auxiliary member 6, such that the massage sleeve 1 forms very localized pressure points to accurately stimulate acupoints or muscle pain points, thereby achieving a good massage effect; and a chain structure is more flexible than an integral strip-shaped structure, which better adapts to the muscle peristalsis and slight shape changes of a body part during massage, achieves dynamic fitting, and prevents discomfort caused by excessive compression.

According to some embodiments of the present disclosure, optionally, as shown in FIG. 16, an end of each of the support segments 201 is further provided with a third limiting portion 2010; the third limiting portion is disposed on a side of the support segment 201 close to the massage sleeve 1; and when the support segment 201 rotates around a point of hinge with the adjacent support segment 201 to a limit position away from the massage sleeve 1, the third limiting portion 2010 is configured to block further rotation thereof.

When the massage structure needs to be relaxed from a compressed massage state, the first engaging portion 22 moves away from the constraint portion 21. In this case, each of the support segments 201 tends to rotate outward (i.e., away from the massage sleeve 1) around a hinge point thereof under the action of an elastic restoring force or gravity of the massage sleeve 1. When rotating to a specific angle, the third limiting portion 2010 on the current support segment 201 comes into contact and collides with the adjacent support segment 201, thereby blocking further rotation thereof. The blocked position is defined as a limit position for outward rotation of the support segment 201.

The third limiting portion 2010 provides a unified physical reference position for all the support segments 201 in a relaxed state. This ensures that after massage each time, the massage sleeve 1 quickly returns to a preset maximum inner diameter state, which prevents incomplete resetting or jamming caused by scattered rebound positions of the support segments 201, thereby enhancing the reliability and consistency of actions of the massage structure. The third limiting portion 2010 prevents excessive reverse rotation of the support segment 201, and even counter-articular excessive eversion, thereby protecting the hinge joints from damage, maintaining the integrity and stability of the entire chain-shaped deformation portion 20, and prolonging the service life thereof.

In a specific implementation process, an elastic material (such as a silicone pad or a polyurethane cushioning block) may be adhered to a contact surface of the third limiting portion 2010, or the contact surface may be designed as an elastic arm structure. When the support segment 201 rotates to a limit position, an elastic body deforms to absorb impact energy, thereby significantly reducing collision noise.

According to some embodiments of the present disclosure, optionally, as shown in FIGS. 17 to 21, the deformation portion 20 includes a reset rope 202 and a plurality of support segments 201; a surface of the support segment 201 away from the constraint portion 21 along the axis L1 is a guide surface 2011, and the guide surface 2011 is configured to come into contact with the adjacent support segment 201; a distance between the guide surface 2011 and the constraint portion 21 progressively decreases from a side of the guide surface 2011 away from the massage sleeve 1 to a side of the guide surface 2011 close to the massage sleeve 1; the side of the support segment 201 away from the massage sleeve 1 is further provided with a third engaging portion 2012 configured to perform snap-fitted engagement with an end of the adjacent support segment 201 away from the constraint portion 21; the reset rope 202 is connected between the first engaging portion 22 and the constraint portion 21, and passes through the third engaging portions 2012 of all the support segments 201; the third engaging portion 2012 is fixedly connected to the reset rope 202; and the first engaging portion 22 performs a linear reciprocating motion along the axis L1 to tension or relax the reset rope 202.

The reset rope 202 is not only an active component that pulls the support segment 201 to reset, but also a constraint portion that keeps connection of all the support segments 201 in series and prevents them from falling apart throughout a motion process.

When the first engaging portion 22 is driven to move linearly toward the constraint portion 21, the reset rope 202 is first in a relatively relaxed state. In this case, the first engaging portion 22 pushes the first support segment 201, and the support segment 201 then squeezes the inclined guide surface 2011 of the adjacent support segment 201. Under the interaction of inclined surfaces, a plurality of the support segments 201 move along the guide surface 2011 and overlap radially (like overlapping each other like roof tiles), thereby collectively pushing the massage sleeve 1 to deform from outside and reducing its inner diameter.

When the first engaging portion 22 moves reversely away from the constraint portion 21, the reset rope 202 is tensioned. A tensile force of the rope acts on all the support segments 201 through the third engaging portion 2012, pulls the support segments 201 to reset, and forces them to slide reversely along the inclined guide surface 2011, such that a radial overlapping state is released, and the inner diameter of the massage sleeve 1 is increased.

The present disclosure achieves the controllability and repeatability of radial motion of the support segments 201 through the relaxation overlapping and tension resetting of the reset rope 202 and the plurality of the support segments 201, in combination with the precise guidance by the inclined guide surface 2011, thereby ensuring the uniformity and stability of changes in the inner diameter of the massage sleeve 1.

According to some embodiments of the present disclosure, optionally, as shown in FIGS. 17 to 21, the support segment 201 is configured as follows: when moving toward the constraint portion 21, the first engaging portion 22 is pushed by the first engaging portion 22 to abut against the guide surface 2011 of the adjacent support segment 201, and moves along the guide surface 2011 until the third engaging portion 2012 is snap-fitted with the adjacent support segment 201 and overlaps with the adjacent support segment 201 in a radial direction of the massage sleeve 1; when moving away from the constraint portion 21, the first engaging portion 22 is pulled by the reset rope 202 to reset to a state where a surface thereof perpendicular to the radial direction of the massage sleeve 1 is flush with the adjacent support segment 201; and the plurality of the support segments 201 overlap in the radial direction of the massage sleeve 1 to push the massage sleeve 1 to deform.

The "overlapping" mentioned in the present disclosure does not mean complete coverage, but means that in a radial projection, a partial region of one support segment 201 is no longer aligned with a partial region of the adjacent support segment 201 in the radial direction, but a phenomenon of misalignment and overlapping is formed, which is a direct result of inward contraction and convergence.

A primary driving force in a contraction stage is a thrust of the first engaging portion 22, which is converted into a radial motion through the guide surface 2011; and a primary driving force in a reset stage is a tensile force of the reset rope 202, and the guide surface 2011 serves as a self-resetting slide rail in this stage.

The motion of the support segment 201 is precisely guided, which is a definite process of pushing, abutting, inclined surface sliding, snap-fit overlapping, which ensures the synchronization and consistency of contraction of all the support segments 201, and prevents the risk of jamming or asynchrony during the motion process.

Figure 21:
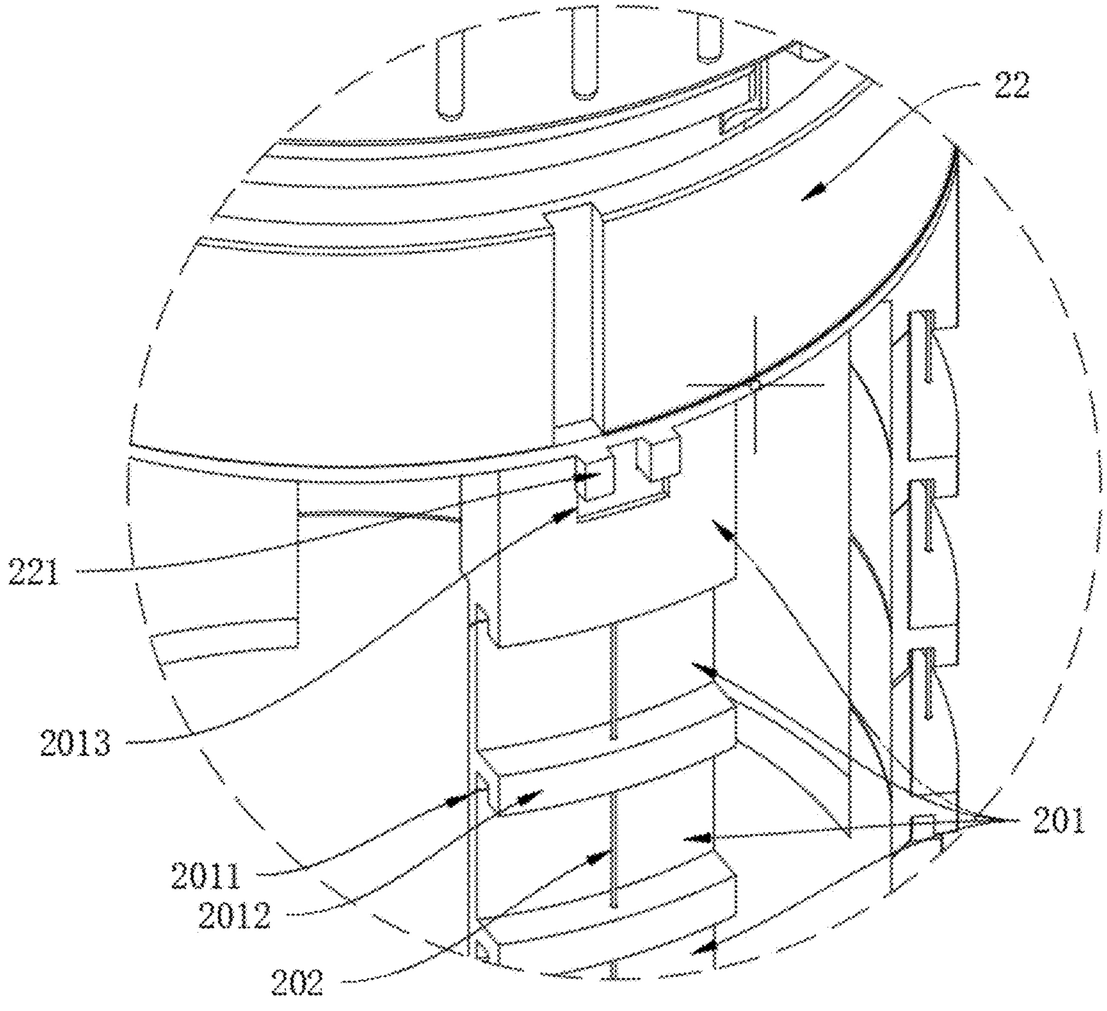
FIG. 21 is a partial enlarged view of a deformation assembly provided in some embodiments of the present disclosure.

According to some embodiments of the present disclosure, optionally, as shown in FIG. 21, a side of the first engaging portion 22 close to the deformation portion 20 is further provided with a convex block 221; and in a direction away from the first engaging portion 22 along the axis L1, the first support segment 201 is provided with a third guide groove 2013 adapted to the convex block 221, and the third guide groove 2013 cooperates with the convex block 221 to limit the first support segment 201 to only have the freedom of movement in the radial direction of the massage sleeve 1.

In an actual operation process: In the contraction stage, when the first engaging portion 22 moves toward the constraint portion 21, the convex block 221 pushes a groove wall of the third guide groove 2013. Since the freedom is limited, the thrust is converted into radial inward movement of the first support segment 201, such that the inclined surface extrusion against the guide surface 2011 of the adjacent support segment 201 is accurately started; and in the reset stage, when the first engaging portion 22 moves away from the constraint portion 21, the convex block 221 slides in the third guide groove 2013, thereby ensuring that the first support segment 201 resets radially outward under the traction of the reset rope 202 without deviation.

The motion of the first support segment 201 is defined as radial movement, which ensures that the contraction process starts with precise radial extrusion, rather than a complex motion potentially containing axial components, thereby ensuring the purity, synchronization, and predictability of contraction action of the entire deformation assembly 2. The massage structure provided by the present disclosure prevents energy loss and action delay caused by possible axial endplay or minor rotation of the first support segment 201, such that every tiny displacement of the first engaging portion 22 may be efficiently and instantly converted into effective radial adjustment, thereby enhancing control precision and response speed of the massage structure.

In a specific implementation process, the third guide groove 2013 may be a T-shaped groove, and the shape of the convex block 221 matches the shape of the third guide groove 2013, which physically limits all other degrees of freedom except radial movement through a geometric structure.

The present disclosure has been described with reference to preferred embodiments, but various modifications thereto may be made without departing from the scope of the present disclosure, and equivalents may be used to replace components therein. In particular, as long as there are no structural conflicts, various technical features mentioned in all embodiments may be combined in any manner. The present disclosure is not limited to specific embodiments disclosed herein but includes all technical solutions that fall within the scope of the claims.

What is claimed is:

1. A massage structure with a variable inner diameter, comprising:

a deformation assembly, sleeved outside a first massage area;

wherein the deformation assembly comprises a deformation portion, a constraint portion, and a first engaging portion, wherein the constraint portion and the first engaging portion are respectively disposed at both ends of the deformation portion along a central axis (L1) of the deformation assembly, and the constraint portion is configured to limit movement of the deformation portion;

a rotating sleeve, provided with a second engaging portion;

wherein the first engaging portion and the second engaging portion are linked in a coupled manner, such that a rotational motion of the rotating sleeve around the axis (L1) is converted into a linear reciprocating motion of the first engaging portion along the axis (L1); and the first engaging portion moves closer to or away from the constraint portion along the axis (L1), which drives at least a portion of the deformation portion to deform toward or away from the first massage area, thereby causing an inner diameter of the deformation assembly to shrink or expand.

2. The massage structure with a variable inner diameter according to claim 1, further comprising:

a guide rail, disposed along the axis (L1);

wherein the first engaging portion is provided with a first guide groove that cooperates with the guide rail; and cooperation between the guide rail and the first guide groove constrains a movement direction of the first engaging portion.

3. The massage structure with a variable inner diameter according to claim 2, wherein the first engaging portion and the second engaging portion have threaded structures engaged with each other;

the first engaging portion is rotationally constrained relative to the rotating sleeve; and during coupling linkage, the rotating sleeve rotates, and drives the first engaging portion to perform a linear reciprocating motion along the axis (L1) through threaded transmission.

4. The massage structure with a variable inner diameter according to claim 2, wherein the first engaging portion is a cylindrical body;

the second engaging portion is a waist-shaped groove;

the cylindrical body is movably disposed in the waist-shaped groove, and an outer peripheral surface thereof is fitted with an inner wall of the waist-shaped groove;

an included angle a is formed between a length direction of the waist-shaped groove and the axis (L1), wherein 90°>a>0; and during coupling linkage, the rotating sleeve rotates, squeezes the cylindrical body through the inner wall of the waist-shaped groove, drives the cylindrical body to move in the length direction of the waist-shaped groove, and then drives the first engaging portion to perform a linear reciprocating motion along the axis (L1).

5. The massage structure with a variable inner diameter according to claim 2, wherein the rotating sleeve is further provided with a first limiting portion;

the first guide groove is provided with a second limiting portion at an end away from the constraint portion along the axis (L1);

the first engaging portion has two limit positions when performing a linear reciprocating motion along the axis (L1); and at one of the limit positions, the first engaging portion is blocked by the first limiting portion; and at the other limit position, the second limiting portion is blocked by the guide rail.

6. The massage structure with a variable inner diameter according to claim 1, further comprising an elastic massage sleeve configured to envelop the first massage area, wherein both the deformation assembly and the rotating sleeve are sleeved outside the massage sleeve, and the deformation assembly is configured to provide support for the massage sleeve such that an inner diameter of the massage sleeve reaches a set size.

7. The massage structure with a variable inner diameter according to claim 6, wherein the deformation portion has a strip-shaped structure; and a plurality of the deformation portions are arranged, and all the deformation portions are disposed circumferentially around the massage sleeve.

8. The massage structure with a variable inner diameter according to claim 7, wherein the deformation portion comprises a deformation segment; and when the deformation portion deforms toward the massage sleeve to shrink the inner diameter of the massage sleeve, the deformation segment constitutes a main deformation occurrence area.

9. The massage structure with a variable inner diameter according to claim 8, wherein material hardness of the deformation segment is less than material hardness of any other portion of the deformation portion.

10. The massage structure with a variable inner diameter according to claim 8, wherein in a direction perpendicular to the axis (L1), a cross-sectional dimension of the deformation segment is smaller than a cross-sectional dimension of any other portion of the deformation portion.

11. The massage structure with a variable inner diameter according to claim 8, further comprising:

an auxiliary member, sleeved outside all the deformation portions and configured to push the corresponding deformation portion to protrude toward the massage sleeve; and the deformation segment is a portion of the deformation portion corresponding to the auxiliary member.

12. The massage structure with a variable inner diameter according to claim 11, wherein the auxiliary member is provided with a second guide groove adapted to the guide rail; and the auxiliary member is configured to move along the axis (L1) to adjust an acting position on the deformation segment of the deformation portion.

13. The massage structure with a variable inner diameter according to claim 11, wherein the deformation portion is composed of a plurality of support segments hingedly connected end to end.

14. The massage structure with a variable inner diameter according to claim 13, wherein an end of each of the support segments is further provided with a third limiting portion;

the third limiting portion is disposed on a side of the support segment close to the massage sleeve; and when the support segment rotates around a point of hinge with the adjacent support segment to a limit position away from the massage sleeve, the third limiting portion is configured to block further rotation thereof.

15. The massage structure with a variable inner diameter according to claim 2, wherein the deformation portion comprises a reset rope and a plurality of support segments;

a surface of the support segment away from the constraint portion along the axis (L1) is a guide surface, and the guide surface is configured to come into contact with the adjacent support segment;

a distance between the guide surface and the constraint portion progressively decreases from a side of the guide surface away from the first massage area to a side of the guide surface close to the first massage area;

the side of the support segment away from the first massage area is further provided with a third engaging portion configured to perform snap-fitted engagement with an end of the adjacent support segment away from the constraint portion;

the reset rope is connected between the first engaging portion and the constraint portion, and passes through the third engaging portions of all the support segments;

the third engaging portion is fixedly connected to the reset rope; and the first engaging portion performs a linear reciprocating motion along the axis (L1) to tension or relax the reset rope.

16. The massage structure with a variable inner diameter according to claim 15, wherein the support segment is configured as follows: when moving toward the constraint portion, the first engaging portion is pushed by the first engaging portion to abut against the guide surface of the adjacent support segment, and moves along the guide surface until the third engaging portion is snap-fitted with the adjacent support segment and overlaps with the adjacent support segment in a radial direction of the massage sleeve;

when moving away from the constraint portion, the first engaging portion is pulled by the reset rope to reset to a state where a surface thereof perpendicular to a radial direction of the deformation assembly is flush with the adjacent support segment; and a plurality of the support segments overlap in the radial direction of the deformation assembly to push the massage sleeve to deform.

17. The massage structure with a variable inner diameter according to claim 15, wherein a side of the first engaging portion close to the deformation portion is further provided with a convex block; in a direction away from the first engaging portion along the axis (L1), the first support segment is provided with a third guide groove adapted to the convex block; and the third guide groove cooperates with the convex block to limit the first support segment to only have a freedom of movement in the radial direction of the deformation assembly.

18. The massage structure with a variable inner diameter according to claim 17, wherein the third guide groove is a T-shaped groove; and a shape of the convex block matches a shape of the third guide groove.

19. A massage structure with a variable inner diameter, comprising:

a deformation assembly and a rotating sleeve, both of which are sleeved outside a first massage area;

a cup body, provided with a rotatable adjustment ring, wherein the adjustment ring is snap-fitted with the rotating sleeve and rotates synchronously with the rotating sleeve; and the adjustment ring is configured to drive the rotating sleeve to rotate, so as to push a middle portion of the deformation assembly to deform toward or away from the first massage area, thereby causing an inner diameter of the deformation assembly to shrink or expand.

20. The massage structure with a variable inner diameter according to claim 19, further comprising:

an auxiliary member, sleeved outside the deformation assembly and configured to push a corresponding portion of the deformation assembly to protrude toward the massage sleeve, wherein this portion deforms prior to other portions;

a surface of the cup body is provided with an adjustable opening that extends along the axis (L1);

an outer peripheral surface of the auxiliary member is provided with an adjustment button, and the adjustment button extends through the adjustable opening to protrude from the cup body; and an elastic sheet is disposed on the adjustment button, and the elastic sheet tightly abuts against the outer peripheral surface of the cup body to position the auxiliary member.

* * * * *